US012194506B2

(12) United States Patent
Kumar et al.

(10) Patent No.: US 12,194,506 B2
(45) Date of Patent: Jan. 14, 2025

(54) SORTING OF CONTAMINANTS

(71) Applicant: Sortera Alloys, Inc., Fort Worth, TX (US)

(72) Inventors: Nalin Kumar, Fort Worth, TX (US); Manuel Gerardo Garcia, Jr., Fort Wayne, IN (US)

(73) Assignee: SORTERA TECHNOLOGIES, INC., Markle, IN (US)

( * ) Notice: Subject to any disclaimer, the term of this patent is extended or adjusted under 35 U.S.C. 154(b) by 280 days.

(21) Appl. No.: 17/752,669

(22) Filed: May 24, 2022

(65) Prior Publication Data

US 2022/0355342 A1 Nov. 10, 2022

Related U.S. Application Data

(60) Continuation-in-part of application No. 17/667,397, filed on Feb. 8, 2022, now Pat. No. 11,969,764, which is a continuation-in-part of application No. 17/495,291, filed on Oct. 6, 2021, now Pat. No. 11,975,365, which is a continuation-in-part of application No. 17/491,415, filed on Sep. 30, 2021, now Pat. No. 11,278,937, which is a continuation-in-part of application No. 17/380,928, filed on Jul. 20, 2021, which is a continuation-in-part of application No. 17/227,245, filed on Apr. 9, 2021, (Continued)

(51) Int. Cl.

| | |
|---|---|
| ***B07C 5/34*** | (2006.01) |
| ***B07C 5/04*** | (2006.01) |
| ***B07C 5/342*** | (2006.01) |

(52) U.S. Cl.
CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search
CPC .. B07C 5/04; B07C 5/34; B07C 5/342; B07C 5/3422; B07C 2501/0054
USPC .......................................................... 209/577
See application file for complete search history.

(56) References Cited

U.S. PATENT DOCUMENTS 2,194,381 A 9/1937 Cadman
2,417,878 A 2/1944 Luzietti et al.

(Continued)

FOREIGN PATENT DOCUMENTS

CA 2893877 12/2015
CA 3065962 A1 * 6/2020 ............ B07C 5/342

(Continued)

OTHER PUBLICATIONS

European Patent Office; Extended European Search Report for corresponding EP 19792330.3; Apr. 30, 2021; 7 pages; Munich, DE.

(Continued)

*Primary Examiner* — Terrell H Matthews
(74) *Attorney, Agent, or Firm* — Kelly Kordzik

(57) ABSTRACT

A material sorting system sorts materials utilizing a vision system that implements a machine learning system in order to identify or classify each of the materials, which are then sorted into separate groups based on such an identification or classification. The material sorting system can sort material pieces containing contaminants, such as copper from steel.

31 Claims, 5 Drawing Sheets
(1 of 5 Drawing Sheet(s) Filed in Color)

Related U.S. Application Data now Pat. No. 11,964,304, which is a continuation-in-part of application No. 16/939,011, filed on Jul. 26, 2020, now Pat. No. 11,471,916, said application No. 17/491,415 is a continuation-in-part of application No. 16/852,514, filed on Apr. 19, 2020, now Pat. No. 11,260,426, said application No. 16/939,011 is a continuation of application No. 16/375,675, filed on Apr. 4, 2019, now Pat. No. 10,722,922, said application No. 16/852,514 is a division of application No. 16/358,374, filed on Mar. 19, 2019, now Pat. No. 10,625,304, said application No. 16/375,675 is a continuation-in-part of application No. 15/963,755, filed on Apr. 26, 2018, now Pat. No. 10,710,119, said application No. 16/358,374 is a continuation-in-part of application No. 15/963,755, filed on Apr. 26, 2018, now Pat. No. 10,710,119, which is a continuation-in-part of application No. 15/213,129, filed on Jul. 18, 2016, now Pat. No. 10,207,296.

(60) Provisional application No. 63/193,379, filed on May 26, 2021, provisional application No. 62/490,219, filed on Apr. 26, 2017, provisional application No. 62/193,332, filed on Jul. 16, 2015.

(56) References Cited

U.S. PATENT DOCUMENTS 2,942,792 A 7/1957 Anderson et al.
2,953,554 A 9/1960 Miller et al.
3,512,638 A 5/1970 Chengges et al.
3,662,874 A 5/1972 Muller
3,791,518 A 2/1974 Vanderhoof
3,955,678 A 5/1976 Moyer
3,973,736 A 8/1976 Nilsson
3,974,909 A 8/1976 Johnson
4,004,681 A 1/1977 Clewett et al.
4,031,998 A 6/1977 Suzuki et al.
4,044,897 A 8/1977 Maxted
4,253,154 A 2/1981 Russ et al.
4,317,521 A 3/1982 Clark et al.
4,413,721 A 11/1983 Bollier
4,488,610 A 12/1984 Yankloski
4,572,735 A 2/1986 Poetzschke et al.
4,586,613 A 5/1986 Horii
4,726,464 A 2/1988 Canziani
4,834,870 A 5/1989 Osterberg et al.
4,848,590 A 7/1989 Kelly
5,016,039 A * 5/1991 Sosa ...................... G03B 7/097 396/50
5,042,947 A 8/1991 Pötzschke et al.
5,054,601 A 10/1991 Sjogren et al.
5,114,230 A 5/1992 Pryor
5,236,092 A 8/1993 Krotkov et al.
5,260,576 A 11/1993 Sommer, Jr. et al.
5,410,637 A 4/1995 Kern et al.
5,433,311 A 7/1995 Bonnet
5,462,172 A 10/1995 Kumagai et al.
5,570,773 A 11/1996 Bonnet
5,663,997 A 9/1997 Willis et al.
5,676,256 A 10/1997 Kumar et al.
5,733,592 A 3/1998 Wettstein et al.
5,738,224 A 4/1998 Sommer, Jr. et al.
5,836,436 A 11/1998 Fortenbery et al.
5,911,327 A 6/1999 Tanaka et al.
6,012,659 A 1/2000 Nakazawa et al.
6,076,653 A 6/2000 Bonnet
6,100,487 A 8/2000 Schultz et al.
6,124,560 A * 9/2000 Roos ....................... B07C 5/361 209/587
6,148,990 A 11/2000 Lapeyre et al.
6,266,390 B1 7/2001 Sommer, Jr. et al.
6,273,268 B1 8/2001 Axmann
6,313,422 B1 11/2001 Anibas
6,313,423 B1 * 11/2001 Sommer ................. B07C 5/366 209/579
6,412,642 B2 7/2002 Charles et al.
6,421,042 B1 * 7/2002 Omura ................ G06F 3/04842 345/157
6,457,859 B1 10/2002 Lu et al.
6,519,315 B2 2/2003 Sommer, Jr. et al.
6,545,240 B2 4/2003 Kumar
6,795,179 B2 9/2004 Kumar
6,888,917 B2 5/2005 Sommer, Jr. et al.
6,983,035 B2 1/2006 Price et al.
7,073,651 B2 7/2006 Costanzo et al.
7,099,433 B2 8/2006 Sommer et al.
7,200,200 B2 4/2007 Laurila et al.
7,341,154 B2 3/2008 Boer
7,564,943 B2 7/2009 Sommer, Jr. et al.
7,616,733 B2 11/2009 Sommer et al.
7,674,994 B1 3/2010 Valerio
7,763,820 B1 7/2010 Sommer, Jr. et al.
7,802,685 B2 9/2010 Allen, III et al.
7,848,484 B2 12/2010 Sommer, Jr. et al.
7,886,915 B2 2/2011 Shulman
7,903,789 B2 3/2011 Morton et al.
7,978,814 B2 7/2011 Sommer et al.
7,991,109 B2 8/2011 Golenhofen
8,073,099 B2 12/2011 Niu et al.
8,144,831 B2 3/2012 Sommer, Jr. et al.
8,172,069 B2 5/2012 Prakasam
8,429,103 B1 4/2013 Aradhye et al.
8,433,121 B2 4/2013 Kosarev
8,476,545 B2 7/2013 Sommer et al.
8,553,838 B2 10/2013 Sommer et al.
8,567,587 B2 10/2013 Faist et al.
8,576,988 B2 11/2013 Lewalter et al.
8,615,123 B2 * 12/2013 Dabic .................... G07D 5/005 382/136
8,654,919 B2 2/2014 Sabol et al.
8,855,809 B2 10/2014 Spencer et al.
8,903,040 B2 12/2014 Maeyama et al.
9,156,162 B2 10/2015 Suzuki et al.
9,316,596 B2 4/2016 Levesque
9,785,851 B1 10/2017 Torek et al.
9,927,354 B1 * 3/2018 Starr .................. G01N 21/3581
10,036,142 B2 * 7/2018 Bamber .................... B07C 5/34
10,207,296 B2 * 2/2019 Garcia ...................... B07C 5/34
10,478,861 B2 11/2019 Comtois et al.
10,710,119 B2 * 7/2020 Kumar ..................... G06N 3/08
10,799,915 B2 10/2020 Horowitz et al.
11,278,937 B2 3/2022 Kumar et al.
2002/0141006 A1 10/2002 Pocius et al.
2003/0038064 A1 2/2003 Harbeck et al.
2003/0147494 A1 8/2003 Sommer, Jr. et al.
2003/0151746 A1 8/2003 Sperling et al.
2004/0151364 A1 8/2004 Kenneway et al.
2004/0235970 A1 11/2004 Smith et al.
2006/0239401 A1 10/2006 Sommer, Jr. et al.
2006/0256341 A1 11/2006 Kuwada
2007/0029232 A1 * 2/2007 Cowling ............... B07C 5/3425 209/577
2008/0029445 A1 2/2008 Russcher et al.
2008/0041501 A1 2/2008 Platek
2008/0092922 A1 4/2008 Dick
2008/0257795 A1 10/2008 Shuttleworth
2009/0292422 A1 11/2009 Eiswerth et al.
2010/0017020 A1 * 1/2010 Hubbard-Nelson .... B07C 5/346 700/230
2010/0091272 A1 4/2010 Asada et al.
2010/0195795 A1 8/2010 Golenhofen
2010/0264070 A1 10/2010 Sommer, Jr. et al.
2010/0282646 A1 11/2010 Looy et al.
2011/0083871 A1 4/2011 Lalancette et al.
2011/0181873 A1 7/2011 Yavets-Chen et al.
2011/0247730 A1 * 10/2011 Yanar ................... B22D 21/007 148/552
2012/0148018 A1 6/2012 Sommer, Jr. et al.
2012/0288058 A1 11/2012 Maeyama et al.
2013/0028487 A1 1/2013 Stager et al.
2013/0079918 A1 3/2013 Spencer et al.

(56) References Cited

U.S. PATENT DOCUMENTS

| | | | | |
|---|---|---|---|---|
| 2013/0092609 | A1 | 4/2013 | Andersen | |
| 2013/0126399 | A1 | 5/2013 | Wolff | |
| 2013/0184853 | A1* | 7/2013 | Roos | B07C 5/346 378/53 |
| 2013/0229510 | A1 | 9/2013 | Killmann | |
| 2013/0264249 | A1 | 10/2013 | Sommer, Jr. et al. | |
| 2013/0304254 | A1* | 11/2013 | Torek | B07C 5/3416 700/223 |
| 2015/0012226 | A1* | 1/2015 | Skaff | G01N 21/55 702/22 |
| 2015/0092922 | A1 | 4/2015 | Liu et al. | |
| 2015/0170024 | A1 | 6/2015 | Chatterjee et al. | |
| 2015/0254532 | A1 | 9/2015 | Talathi et al. | |
| 2015/0336135 | A1 | 11/2015 | Corak | |
| 2016/0016201 | A1* | 1/2016 | Schons | B07B 1/14 209/658 |
| 2016/0022892 | A1 | 1/2016 | Eifler et al. | |
| 2016/0066860 | A1 | 3/2016 | Sternickel | |
| 2016/0136694 | A1* | 5/2016 | Janda | G01N 15/1434 209/576 |
| 2016/0180626 | A1 | 6/2016 | Young | |
| 2016/0299091 | A1 | 10/2016 | Bamber et al. | |
| 2016/0346811 | A1 | 12/2016 | Iino | |
| 2017/0014868 | A1 | 1/2017 | Garcia et al. | |
| 2017/0221246 | A1 | 8/2017 | Zhong et al. | |
| 2017/0232479 | A1* | 8/2017 | Pietzka | B07C 5/342 209/3.3 |
| 2018/0065155 | A1 | 3/2018 | Ripley | |
| 2018/0243800 | A1* | 8/2018 | Kumar | G06N 20/00 |
| 2019/0130560 | A1 | 5/2019 | Horowitz et al. | |
| 2019/0299255 | A1* | 10/2019 | Chaganti | G06V 10/56 |
| 2020/0050922 | A1 | 2/2020 | Wu et al. | |
| 2020/0084966 | A1 | 3/2020 | Corban et al. | |
| 2020/0361659 | A1 | 11/2020 | Whitman et al. | |
| 2020/0368786 | A1 | 11/2020 | Kumar et al. | |
| 2021/0094075 | A1 | 4/2021 | Horowitz et al. | |
| 2021/0217156 | A1 | 7/2021 | Balachandran et al. | |
| 2021/0229133 | A1 | 7/2021 | Kumar et al. | |
| 2021/0346916 | A1 | 11/2021 | Kumar et al. | |

FOREIGN PATENT DOCUMENTS

| | | | | | |
|---|---|---|---|---|---|
| CN | 1283319 | | | 2/2001 | |
| CN | 200953004 | | | 9/2007 | |
| CN | 201440132 | | | 4/2010 | |
| CN | 201464390 | | | 5/2010 | |
| CN | 101776620 | A | | 7/2010 | |
| CN | 201552461 | | | 7/2010 | |
| CN | 102861722 | | | 1/2013 | |
| CN | 103501925 | | | 1/2014 | |
| CN | 103745901 | | | 4/2014 | |
| CN | 101776620 | B | | 6/2014 | |
| CN | 103955707 | | | 7/2014 | |
| CN | 203688493 | | | 7/2014 | |
| CN | 204359695 | | | 5/2015 | |
| CN | 204470139 | | | 7/2015 | |
| CN | 204495749 | | | 7/2015 | |
| CN | 204537711 | | | 8/2015 | |
| CN | 204575572 | | | 8/2015 | |
| CN | 104969266 | | | 10/2015 | |
| CN | 106000904 | | | 10/2016 | |
| CN | 107403198 | | | 11/2017 | |
| CN | 107552412 | | | 1/2018 | |
| CN | 107552412 | A | * | 1/2018 | B07C 5/342 |
| CN | 107790398 | | | 3/2018 | |
| CN | 21188005 | U | | 11/2020 | |
| DE | 202009006383 | | | 9/2009 | |
| EP | 0011892 | | | 11/1983 | |
| EP | 0074447 | | | 1/1987 | |
| EP | 0433828 | A2 | | 12/1990 | |
| EP | 0351778 | B1 | | 10/1993 | |
| EP | 2243089 | A1 | | 10/2010 | |
| EP | 3263234 | | | 1/2018 | |
| JP | H07-275802 | | | 10/1995 | |
| JP | 2010-172799 | | | 8/2010 | |
| JP | 5083196 | | | 11/2012 | |
| JP | 2015-512075 | | | 4/2015 | |
| JP | 5969685 | | | 7/2016 | |
| JP | 2017-109197 | | | 6/2017 | |
| JP | 202163078 | | | 10/2021 | |
| KR | 20090106056 | | | 10/2009 | |
| RU | 2004101401 | | | 2/2005 | |
| RU | 2006136756 | | | 4/2008 | |
| RU | 2339974 | | | 11/2008 | |
| RU | 2361194 | | | 7/2009 | |
| WO | WO9920048 | | | 4/1999 | |
| WO | WO2001/022072 | | | 3/2001 | |
| WO | WO2009/039284 | | | 3/2009 | |
| WO | WO2011/159269 | | | 12/2011 | |
| WO | WO2012/094568 | | | 7/2012 | |
| WO | WO2013/033572 | | | 3/2013 | |
| WO | WO2013/180922 | | | 12/2013 | |
| WO | WO2015/195988 | | | 12/2015 | |
| WO | WO2016/199074 | | | 12/2016 | |
| WO | WO2017/001438 | | | 1/2017 | |
| WO | WO2017/011835 | | | 1/2017 | |
| WO | WO-2017011835 | A1 | * | 1/2017 | B07C 5/10 |
| WO | WO2017/221246 | | | 12/2017 | |
| WO | WO-2019241114 | A1 | * | 12/2019 | B07C 5/3422 |
| WO | WO2021/089602 | | | 5/2021 | |
| WO | WO2021/126876 | | | 6/2021 | |
| WO | WO-2021126876 | A1 | * | 6/2021 | B07C 5/342 |
| WO | WO2019/180438 | | | 9/2022 | |

OTHER PUBLICATIONS

India Patent Office; Office Action issued for corresponding India Application Serial No. 201937044046; Jun. 4, 2020; 7 pages; IN.

United States International Searching Authority; International Search Report & Written Opinion for PCT/US2016/042850; Sep. 28, 2016; 15 pages; Alexandria, VA; US.

International Alloy Designations and Chemical Composition Limits for Wrought Aluminum and Wrought Aluminum Alloys, The Aluminum Association, Inc., revised Jan. 2015, 38 pages.

International Searching Authority, International Search Report and the Written Opinion, International Application No. PCT/US2016/042850, Sep. 28, 2016.

P. R. Schwoebel et al., "Studies of a prototype linear stationary x-ray source for tomosynthesis imaging," Phys. Med Biol. 59, pp. 2393-2413, Apr. 17, 2014.

R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.

Scrap Specifications Circular, Institute of Scrap Recycling Industries, Inc., effective Jan. 21, 2016, 58 pages.

The International Bureau of WIPO, International Preliminary Report on Patentability, International Application No. PCT/US2016/42850, Jan. 25, 2018.

A. Lee, "Comparing Deep Neural Networks and Traditional Vision Algorithms in Mobile Robotics," Swarthmore College, 9 pages, downloaded from Internet on May 1, 2018.

C. K. Lowe et al., "Data Mining With Different Types of X-Ray Data," JCPDS-International Centre for Diffraction Data 2006, ISSN 1097-0002, pp. 315-321.

M. Razzak et al., "Deep Learning for Medical Image Processing: Overview, Challenges and Future," 30 pages, downloaded from Internet on May 1, 2018.

J. Schmidhuber et al., "Deep Learning in Neural Networks: An Overview," The Swiss AI Lab IDSIA, Technical Report IDSIA-03-14/arXiv:1404.7828 v4 [cs.NE], Oct. 8, 2014, 88 pages.

M. Singh et al., "Transforming Sensor Data to the Image Domain for Deep Learning—an Application to Footstep Detection," International Joint Conference on Neural Networks, Anchorage, Alaska, 8 pages, May 14-19, 2017.

K. Tarbell et al., "Applying Machine Learning to the Sorting of Recyclable Containers," University of Illinois at Urbana-Champaign, Urbana, Illinois, 7 pages, downloaded from Internet on May 1, 2018.

(56) References Cited

OTHER PUBLICATIONS

Wikipedia, Convolutional neural network, 18 pages https://en.wikipedia.org/w/index.php?title=Convolutional_neural network, downloaded from Internet on May 1, 2018.
Wikipedia, TensorFlow, 4 pages https://en.wikipedia.org/w/index.php?title=TensorFlow&oldid=835761390, downloaded from Internet on May 1, 2018.
The United States Patent and Trademark Office, Non-Final Office Action, U.S. Appl. No. 15/213,129, filed Oct. 6, 2017.
International Searching Authority, International Search Report and the Written Opinion, International Application No. PCT/US2018/029640, Jul. 23, 2018; 23 pages; Alexandria, VA; US.
European Patent Office; Extended Search Report for 16825313.6; Jan. 28, 2019; 12 pages; Munich, DE.
India Patent Office; Office Action issued for corresponding India Application Serial No. 201817002365; Mar. 12, 2020; 6 pages; IN.
International Searching Authority, International Search Report and the Written Opinion, International Application No. PCT/US2019/022995, Jun. 5, 2019; 10 pages; Alexandria, VA; US.
T. Miller et al., "Elemental Imaging For Pharmaceutical Tablet Formulations Analysis By Micro X-Ray Fluorescence," International Centre for Diffraction Data, 2005, Advances in X-ray Analysis, vol. 48, pp. 274-283.
T. Moriyama, "Pharmaceutical Analysis (5), Analysis of trace impurities in pharmaceutical products using polarized EDXRF spectrometer NEX CG," Rigaku Journal, vol. 29, No. 2, 2013, pp. 19-21.
U.S. Appl. No. 15/213,129, filed Jul. 18, 2016.
M. Baudelet et al., "The first years of laser-induced breakdown spectroscopy," J. Anal. At. Spectrom., Mar. 27, 2013, 6 pages.
International Searching Authority, International Search Report and The Written Opinion of the International Searching Authority, International Application No. PCT/US2016/45349, Oct. 17, 2016.
J. McComb et al., "Rapid screening of heavy metals and trace elements in environmental samples using portable X-ray fluorescence spectrometer, A comparative study," Water Air Soil Pollut., Dec. 2014, vol. 225, No. 12, pp. 1-16.
J. Mondia, "Using X-ray fluorescence to measure inorganics in biopharmaceutical raw materials," Anal. Methods, Mar. 18, 2015, vol. 7, pp. 3545-3550.
L. Goncalves, "Assessment of metal elements in final drug products by wavelength dispersive X-ray fluorescence spectrometry," Anal. Methods, May 19, 2011, vol. 3, pp. 1468-1470.
L. Hutton, "Electrochemical X-ray Fluorescence Spectroscopy for Trace Heavy Metal Analysis: Enhancing X-ray Fluorescence Detection Capabilities by Four Orders of Magnitude," Analytical Chemistry, Apr. 4, 2014, vol. 86, pp. 4566-4572.
L. Moens et al., Chapter 4, X-Ray Fluorescence, Modern Analytical Methods in Art and Archaeology, Chemical Analysis Series, vol. 155, pp. 55-79, copyright 2000.
H. Rebiere et al., "Contribution of X-Ray Fluorescence Spectrometry For the Analysis of Falsified Products," ANSM, The French National Agency for Medicines and Health Products Safety, Laboratory Controls Division, France, 1 page, (date unknown).
B. Shaw, "Applicability of total reflection X-ray fluorescence (TXRF) as a screening platform for pharmaceutical inorganic impurity analysis," Journal of Pharmaceutical and Biomedical Analysis, vol. 63, 2012, pp. 151-159.
Briefing Elemental Impurities-Limits, Revision Bulletin, The United States Pharmacopeial Convention, Feb. 1, 2013, 3 pages.
Chapter 6, Functional Description, S2 Picofox User Manual, 2008, pp. 45-64.
D. Bradley, "Pharmaceutical toxicity: AAS and other techniques measure pharma heavy metal," Ezine, May 15, 2011, 2 pages.
E. Margui et al., "Determination of metal residues in active pharmaceutical ingredients according to European current legislation by using X-ray fluorescence spectrometry," J. Anal. At. Spectrom., Jun. 16, 2009, vol. 24, pp. 1253-1257.
Elemental Impurity Analysis In Regulated Pharmaceutical Laboratories, A Primer, Agilent Technologies, Jul. 3, 2012, 43 pages.
Exova, X-ray fluorescence: a new dimension to elemental analysis, downloaded from www.exova.com on Jul. 26, 2016, 3 pages.
G. O'Neil, "Direct Identification and Analysis of Heavy Metals in Solution (Hg, Cu, Pb, Zn, Ni) by Use of in Situ Electrochemical X-ray Fluorescence," Analytical Chemistry, Feb. 2015, 22 pages.
Guideline for Elemental Impurities, Q3D, International Conference on Harmonisation of Technical Requirements For Registration of Pharmaceuticals for Human Use, ICH Harmonised Guideline, Current Step 4 version, Dec. 16, 2014, 77 pages.
The United States Patent and Trademark Office, Non-Final Office Action, U.S. Appl. No. 16/375,675, filed Jun. 28, 2019.
The United States Patent and Trademark Office, Final Office Action, U.S. Appl. No. 16/375,675, filed Jan. 17, 2020.
"Alloy Data: Aluminum Die Casting Alloys," MES, Inc., 4 pages, downloaded from the internet Mar. 28, 2019, www.mesinc.com.
C.O. Augustin et al., "Removal of Magnesium from Aluminum Scrap and Aluminum-Magnesium Alloys," Bulletin of Electrochemistry 2(6), Nov.-Dec. 1986; pp. 619-620.
E.A. Vieira et al., "Use of Chlorine to Remove Magnesium from Molten Aluminum," Materials Transactions, vol. 53, No. 3, pp. 477-482, Feb. 25, 2012.
Skpecim Spectral Imaging; Hyperspectral Technology vs. RGB; at least as early as Mar. 9, 2021; 3 pages; Oulu, Finland.
Wikipedia; Digital image processing; Retrieved from https://en.wikipedia.org/w/index.php?title=Digital_image_processing&oldid=1015648152; Apr. 2, 2021; Wikimedia Foundation, Inc.; US.
Wikipedia; Machine vision; Retrieved from https://en.wikipedia.org/w/index.php?title=Machine_vision&oldid=1021673757; May 6, 2021; Wikimedia Foundation, Inc.; US.
Aclima; How artificial intelligence helps recycling become more circular; retrieved frfom https://aclima.eus/how-artificial-intelligence-helps-recycling-become-more-circular; Jan. 27, 2022; (5 pages); VE.
Guillory et al; Analysis of Multi-layer polymer films; Apr. 2009; vol. 12; No. 4, Materials Today; 2 pages; Elseview; NL.
U.S. Department of Energy; Waste-to-Energy From Municipal Solid Wastes; Aug. 2019; 36 pages; US.
SAPP; Lehigh University scores $3.5M Doe Grant to use AI and spectroscopy to analyze waste materials; Biofuelsdigest.com; retrieved from https://www.biofuelsdigest.com/bdigest/2021/09/27/lehigh-university-scores-3-5m-doe-grant-to-use-ai-and-spectroscopy-to-analyse-waste-materials/; 1 page; Sep. 27, 2021; US.
Energy Information Administration; Methodoly for Allocating Municipal solid Waste to Biogenic and Non-Biogenic Energy; May 2007; 18 pages; US.
Fadillah et al.; Recent Progress in Low-Cost Catalysts for Pyrolysis of Plastic Waste to Fuels; 17 pages; Catalysts 2021, 11, 837; Jul. 10, 2021; mdpi.com; Basel, Switzerland.
Lukka et al; Robotic Sorting using Machine Learing; ZenRobotics Recycler; Sensor Based Sorting 2014; https://users.ics.aalto.fi > praiko > papers > SBS14; US.
Wikipedia; Plastic recycling; Retrieved from "https://en.wikipedia.org/w/index.php?title=Plastic_recycling&oldid=1067847730"' Jan. 25, 2022; Wikimedia Foundation, Inc; US.
Aimplas; Classification and identification of plastics; https://www.aimplas.net/blog/plastics-identification-and-classification/; Jan. 27, 2022; 4 pages; València Parc Tecnològic; Valencia; Spain.
SPECIM; Plastics Sorting with SPECIM FX Cameras; 5 pages; Dec. 18, 2020; Oulu, FI.
Ruj et al; Sorting of plastic waste for effective recycling; Int. Journal of Applied Sciences and Engineering Research, vol. 4, Issue 4, 2015; 8 pages; International Journal of Applied Science and Engineering Research; ijaser.com; New Delhi, IN.
Wikipedia; Spectral imaging; Retrieved from "https://en.wikipedia.org/w/index.php?title=Spectral_imaging&oldid=1066379790"; Jan. 18, 2022; Wikimedia Foundation, Inc; US.
Acplasics, Inc.; 7 Different Types of Plastic; https://www.acplasticsinc.com/informationcenter/r/7-different-types-of-plastic-and-how-they-are-used; 4 pages; Jan. 27, 2022; A&C Plastics; Houston, TX.
Daehn et al; Preventing Wetting Between Liquid Copper and Solid Steel: A Simple Extraction Technique; Metallurgical and Materials Transactions B; vol. 50B; Aug. 2019; pp. 1637-1651; Springer; NY, NY; US.

(56) References Cited

OTHER PUBLICATIONS

Daehn et al; How Will Copper Contamination Constrain Future Global Steel Recycling ?; Environmental Science & Technology; Amerian Chemical Society; ACS Publictions; DOI: 10.1021/acs.est.7b00997; at least as early as May 2022; Washington; US.
Daehn et al; Finding the Most Efficient Way to Remove Residual Copper from Steel Scrap; Metallurigical and Materials Transactions B; vol. 50B, Jun. 2019; pp. 1225-1240; Springer, NY, NY; US.
Shattuck et al.; The Case for Producing Low-Copper Steel with Ballistic Separators; May 2, 2018; https://wasteadvantagemag.com/the-case-for-producing-low-copper-steel-with-ballistic-separators/; FL; US.
Daehn, Katrin E.; Copper contamination in end-of-life steel recycling, developing a new strategy from million-tonnes to milligrams; thesis; St. Catherine's College; University of Cambridge; Jan. 2019; 258 pagess; UK.
Rozenstein, O. et al; Development of a new approach based on midwave infrared spectroscopy for post-consumer black plastic waste sorting in the recycling industry; Waste Management 68 (2017; pp. 38-44; abstract.
United States International Searching Authority; International Search Report & Written Opinion for PCT/US2022/015693; May 6, 2022; 9 pages; Alexandria, VA; US.
United States International Searching Authority; International Search Report & Written Opinion for PCT/US2022/015665; May 23, 2022; 10 pages; Alexandria, VA; US.
Chinese Patent Office; Office Action issued for corresponding Chinese Application No. 201980043725.X on Apr. 28, 2022; 21 pages; Beijing, CN.
United States International Searching Authority; International Search Report & Written Opinion for PCT/US2022/020657; Jun. 16, 2022; 10 pages; Alexandria, VA.
Bishop, Christopher M.; Neural Networks for Pattern Recognition; 494 pages; Clarendon Press; 1995; Oxford, UK.
United States International Searching Authority; International Search Report & Written Opinion for PCT/US2022/016869; Jun. 29, 2022; 11 pages; Alexandria, VA.
United States International Searching Authority; International Search Report & Written Opinion for PCT/US2022/060626; May 2, 2023; 12 pages; Alexandria, VA.
United States International Searching Authority; International Search Report & Written Opinion for PCT/US2022/051681; Mar. 20, 2023; 6 pages; Alexandria, VA.
United States International Searching Authority; International Search Report & Written Opinion for PCT/US2022/039622; Oct. 28, 2022; 12 pages; Alexandria, VA.
Zhou et al; SSA-CNN: Semantic Self-Attention CNN for Pedestrian Detetion:; arXiv: 1902.09080v3 [cs. CF] Jun. 6, 2019. Retrieved o Oct. 10, 2022; Retrieved from <URL: https://arxivorg/pdf/1902.09080.pdf>.
Jones et al., "Safe Steering Wheel Airbag Removal Using Active Disassemly":, DS 30; Proceedings of DESIGN 2002, the 7th International Design Converence, dubrovnik, Retrieved on Jul. 10, 2022, from <https://desigsociety.org/publiatio/29632/Safe+Steering+Wheel+Airbag+Removal+Using+Active+Dissembly>.
Zhang, et al.; Designing and verifying a disassembly line approach to cope with the upsurge of end-of-life vehicles in China:, Elsevier, Waste Management 2018, Retrieved on Jul. 10, 2022 from <https://isiarticles.com/budles/Article/pre/pdf/98926.pdf>.
Japan Patent Office; Office Action issued Jan. 10, 2023 for Serial No. 2021-509947; 9 pages (with translation).
United States International Searching Authority; International Search Report & Written Opinion for PCT/US2022/030943; Sep. 28, 2022; 10 pages; Alexandria, VA.
Gao; Applying Improved Optical Recognition with Machine Learning on Sorting Cu Impurities in Steel Scrap; 1-12, Journal of Sustainable Metallurgy, Web, Dec. 7, 2020.

* cited by examiner

SORTING OF CONTAMINANTS

RELATED PATENTS AND PATENT APPLICATIONS

This application claims priority to U.S. Provisional Patent Application Ser. No. 63/193,379. This application is a continuation-in-part application of U.S. patent application Ser. No. 17/667,397, which is a continuation-in-part application of U.S. patent application Ser. No. 17/495,291, which is a continuation-in-part application of U.S. patent application Ser. No. 17/491,415 (issued as U.S. Pat. No. 11,278,937), which is a continuation-in-part application of U.S. patent application Ser. No. 17/380,928, which is a continuation-in-part application of U.S. patent application Ser. No. 17/227,245, which is a continuation-in-part application of U.S. patent application Ser. No. 16/939,011, which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which is a continuation-in-part application of U.S. patent application Ser. No. 15/213,129 (issued as U.S. Pat. No. 10,207,296), which claims priority to U.S. Provisional Patent Application Ser. No. 62/193,332, all of which are hereby incorporated by reference herein. U.S. patent application Ser. No. 17/491,415 (issued as U.S. Pat. No. 11,278,937) is a continuation-in-part application of U.S. patent application Ser. No. 16/852,514, which is a divisional application of U.S. patent application Ser. No. 16/358,374, which is a continuation-in-part application of U.S. patent application Ser. No. 15/963,755 (issued as U.S. Pat. No. 10,710,119), which claims priority to U.S. Provisional Patent Application Ser. No. 62/490,219, all of which are hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the classification and sorting of materials, and in particular, to the sorting of contaminants from a stream of materials.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy.

Ferrous scrap, which includes iron and steel, is the world's most recycled material. More than 40 percent of the world's steel production is made from recycled ferrous scrap. Moreover, it has been suggested that all projected future growth in demand for steel could be met by recycling. However, end-of-life steel scrap is often contaminated with other metals (referred to herein as "contaminants"), such as copper, nickel, chrome, manganese, and tin. If contaminants cannot be extracted from the electric arc furnace ("EAF") melt, then they are known as "tramp elements." For example, tramp elements in steel recycling are copper and tin. See Nakajima et al., "Thermodynamic analysis for the controllability of elements in the recycling process of metals," Environ. Sci. Technol. 2011, vol. 45, pp. 4929-4936, which is hereby incorporated by reference herein.

Copper is pervasive in end-of-life scrap, originating mostly from copper wires and motors in automobiles, appliances, and machinery that attach to (or are embedded in) steel during the shredding process. Copper in steel causes metallurgical problems, and cannot currently be removed commercially once in the melt. For example, concentrations of copper over 0.1 wt % (i.e., percentage by weight or weight percentage) cause hot shortness, a phenomenon leading to surface cracking in hot rolling and forming. Tin exacerbates hot shortness, even at concentrations as low as 0.04 wt %. See K. E. Daehn et al., "*How Will Copper Contamination Constrain Future Global Steel Recycling*?" Environ. Sci. Technol., vol. 51, no. 11, pp. 6599-6606, Apr. 26, 2017, which is hereby incorporated by reference herein.

Consequently, today's steel mills seek shredded auto scrap (also referred to as End-of-Life Vehicles ("ELV")) with low copper content. See "*The Case for Producing Low-Copper Steel with Ballistic Separators*," Waste Advantage Magazine, May 2, 2018, which is hereby incorporated by reference herein. Steel mills are more demanding than ever: the low-copper specification for U.S. steel mills is now 0.17 wt % copper. Low copper content is critical to steel mills because copper causes loss of ductility at 1,050° C. to 1,200° C. Copper produces surface defects along the entire process, especially during casting and rolling. Since copper also has a low affinity to oxygen and cannot be removed from the steel melt, steel mills may need to add elements, such as nickel, to offset the copper. This process equates to more time and money.

Dilution with virgin iron, or less contaminated scrap sources, is the only commercially practiced solution for reducing the concentration of tramp elements in the steel melt. Hand-picking of copper from the waste stream is often practiced; however, contaminated scrap often goes to more forgiving applications. Reinforcing bar has a nominal tolerance of 0.4 wt % copper, while flat products requiring excellent formability and surface properties have the most stringent limits (less than 0.06 wt % copper for drawing steels), so end-of-life scrap is generally not a significant supply source for these products. It is clear that the severity of the copper contamination problem will increase over time.

Consequently, copper is currently the main barrier to producing high quality steel from recycled scrap. Moreover, end of-life vehicles are the most potent contaminating source to the steel system, while new cars are the main end-use behind the demand for the highest quality steel. Exacerbating the growing problem is that copper usage in cars has been increasing, with electric and hybrid vehicles containing twice the copper content of an average vehicle.

It has been forecast that steel recycling will likely be globally constrained by copper concentration beginning around the year 2050. The year 2030 marks the beginning of when dilution and distribution of scrap to the various product categories will be necessary on a global scale. By 2050, the total copper in the supply is forecast to be about the same as the maximum that can be tolerated across all products and to match supply with demand, scrap will have to be cast and rolled into flat and plate products. Best estimates show copper contamination could theoretically be managed until 2050, assuming perfect distribution of copper in the global steel system. However, in this case extensive dilution and careful allocation of scrap at a global scale would be required by 2030. As the demand for copper-tolerant products (such as reinforcing bars) is likely to grow at a slower rate than demand for higher quality steels (such as those used in the production of cars), interventions will eventually be necessary to avoid accumulating stocks of unusable steel scrap.

The most common metallurgical techniques for removing impurities in metal include (i) transferring the impurities to a second phase where the impurity has a high solubility and the second phase is not soluble in the molten metal, (ii) the impurity reacts with the second phase, (iii) the impurity reacts with another element and the reaction product is then removed from the melt, (iv) an electric potential is applied to the melt to remove the impurity by electrolysis, or (v) allowing the molten metal to partially solidify and then removing the impurities from either the liquid or solid phase. Investigations into the removal of copper from steel began in the 1950's and continue today. However, due to the nature of each investigation occurring under a set of constrained conditions, it is not easy to assess or compare the results; therefore, the problem of copper as an impurity is still present in steel recycling and manufacturing today.

Each of these methods for impurity control are employed in the steel manufacturing process with an EAF. The existing process steps during an EAF melt include deoxidation, desulfurization, degassing, and alloying. Through each of these steps, it is possible to make adjustments and homogenize the steel melt. Although these process steps are sufficient for the existing economics towards the production of steel, an economically beneficial metallurgical process for removing copper has yet to be realized and is still a problem today.

Due to the economic challenge of removing copper from steel through metallurgical techniques, there are non-metallurgical methods that attempt to control the amount of copper impurities.

First, copper can be separated from steel through magnetic and manual methods before the melt process. For example, copper can be removed by hand from vehicles to liberate the total amount of copper going into the melt, but the cost of labor is too high to make this feasible. Also, both magnetic and ballistic methods have been attempted to remove copper moving on a conveyor belt, but with little success (with as much as 20 wt % of the copper still remaining within the ferrous scrap).

Second, improved sorting methods might have the potential to remove copper by analytical scientific identification techniques. X-ray fluorescence spectroscopy, laser induced breakdown spectroscopy, and gamma spectroscopy all have the potential to identify copper at certain concentrations while a stream of materials is moving over a conveyor belt. However, current state-of-the-art spectroscopy industrial sorting machines have not yet been designed to perform this type of sorting with sufficient accuracy, precision, and efficiency.

Third, scrap batching is a method of controlling the inputs of individual components before they are used in the melt. By sourcing low copper concentration materials, the total amount of copper in the final product could be reduced.

Fourth, primary steel can be added during the melt to dilute residual elements. However, dilution is expensive and undercuts the benefits gained from recycling.

Fifth, the amelioration of hot shortness can lead to an increased tolerance for copper by way of process optimization. Although this is a process improvement, the underlying mechanism of the source copper impurities ending up in the melt is still present.

Sixth, reducing the copper components in products such as automobiles could reduce the copper content in the steel manufacturing. However, not only would these methods take decades to improve the quality, but it would also require novel automobile manufacturing methods and material development which has yet to occur. See K. E. Daehn et al., "*Finding the Most Efficient Way to Remove Residual Copper from Steel Scrap*," Metallurgical and Materials Transactions, vol. 50B, pp. 1225-1240, June 2019, which is hereby incorporated by reference herein.

In summary, although there are techniques that have been investigated to remove copper from the steel manufacturing process, economic viability for each of these techniques has yet to be demonstrated.

As long as copper remains in the steel melt during refining, it will remain in the cycle once embedded in products, and many steel products have long lifetimes; thus, current actions will have long-term consequences. Forward-thinking and careful investment in the development and deployment of processes and policies to manage copper in the steel system will be necessary to avoid an accumulation of unusable scrap.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
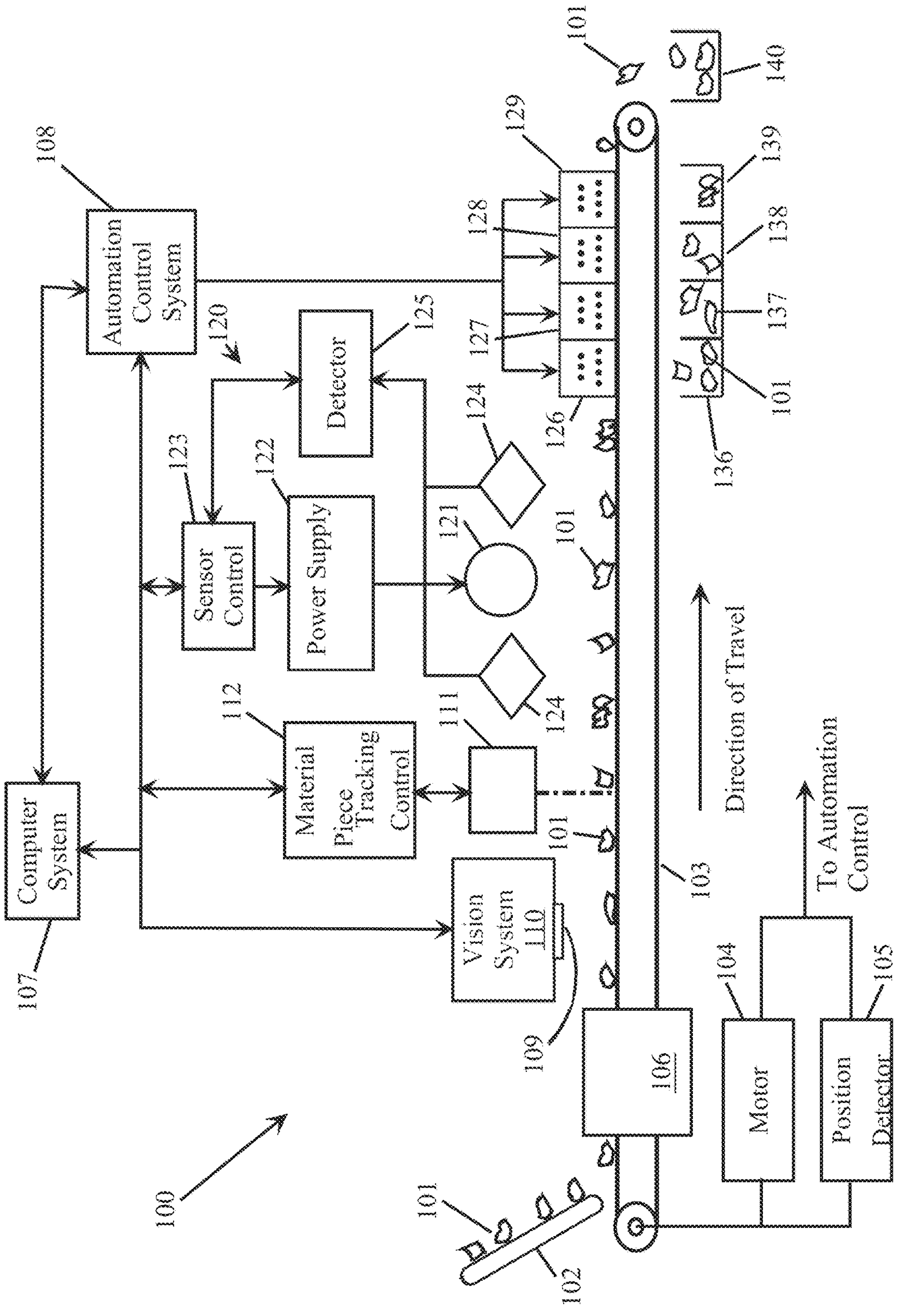
FIG. 1 illustrates a schematic of a sorting system configured in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, "materials" may include any item or object, including but not limited to, metals (ferrous and nonferrous), metal alloys, pieces of metal embedded in another different material, plastics (including, but not limited to any of the plastics disclosed herein, known in the industry, or newly created in the future), rubber, foam, glass (including, but not limited to borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, scrap from end-of-life vehicles, mining, construction, and demolition waste, crop wastes, forest residues, purpose-grown grasses, woody energy crops, microalgae, urban food waste, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein.

In a more general sense, a "material" may include any item or object composed of a chemical element, a compound or mixture of one or more chemical elements, or a compound or mixture of a compound or mixture of chemical elements, wherein the complexity of a compound or mixture may range from being simple to complex (all of which may also be referred to herein as a material having a particular "chemical composition"). "Chemical element" means a chemical element of the periodic table of chemical elements, including chemical elements that may be discovered after the filing date of this application. Within this disclosure, the terms "scrap," "scrap pieces," "materials," and "material pieces" may be used interchangeably. As used herein, a material piece or scrap piece referred to as having a metal alloy composition is a metal alloy having a particular chemical composition that distinguishes it from other metal alloys.

As used herein, a "contaminant" is any material, or a component of a material piece, that is to be excluded from a group of sorted materials.

Heavy melting steel ("HMS") or heavy melting scrap (also referred to as "Heavies") is a designation for recyclable steel and iron. As defined within the Guidelines for Nonferrous Scrap promulgated by the Institute Of Scrap Recycling Industries, Inc. ("ISRI") in the United States, the term "Zorba" is the collective term for shredded nonferrous metals, including, but not limited to, those originating from end-of-life vehicles ("ELVs") or waste electronic and electrical equipment ("WEEE"). In Zorba, each scrap piece may be made up of a combination of one or more nonferrous metals (e.g., aluminum, copper, lead, magnesium, stainless steel, nickel, tin, and zinc, in elemental or alloyed (solid) form). The term "aluminum" refers to aluminum metal and aluminum-based alloys, viz., alloys containing more than 50% by weight aluminum (including those classified by the Aluminum Association). Furthermore, the term "Twitch" shall mean fragmented aluminum scrap. Twitch may be produced by a float process whereby the aluminum scrap floats to the top because heavier metal scrap pieces sink (for example, in some processes, sand may be mixed in to change the density of the water in which the scrap is immersed).

As well known in the industry, a "polymer" is a substance or material composed of very large molecules, or macromolecules, composed of many repeating subunits. A polymer may be a natural polymer found in nature or a synthetic polymer. "Multilayer polymer films" are composed of two or more different compositions and may possess a thickness of up to about $7.5^{-8}\times10^{-4}$ m. The layers are at least partially contiguous and preferably, but optionally, coextensive. As used herein, the terms "plastic," "plastic piece," and "piece of plastic material" (all of which may be used interchangeably) refer to any object that includes or is composed of a polymer composition of one or more polymers and/or multilayer polymer films.

As used herein, the term "chemical signature" refers to a unique pattern (e.g., fingerprint spectrum), as would be produced by one or more analytical instruments, indicating the presence of one or more specific elements or molecules (including polymers) in a sample. The elements or molecules may be organic and/or inorganic. Such analytical instruments include any of the sensor systems disclosed herein, and also disclosed in U.S. patent application Ser. No. 17/667,397, which is hereby incorporated by reference herein. In accordance with embodiments of the present disclosure, one or more such sensor systems may be configured to produce a chemical signature of a material piece.

As used here in, a "fraction" refers to any specified combination of organic and/or inorganic elements or molecules, polymer types, plastic types, polymer compositions, chemical signatures of plastics, physical characteristics of the plastic piece (e.g., color, transparency, strength, melting point, density, shape, size, manufacturing type, uniformity, reaction to stimuli, etc.), etc., including any and all of the various classifications and types of plastics disclosed herein. Non-limiting examples of fractions are one or more different types of plastic pieces that contain: LDPE plus a relatively high percentage of aluminum; LDPE and PP plus a relatively low percentage of iron; PP plus zinc; combinations of PE, PET, and HDPE; any type of red-colored LDPE plastic pieces; any combination of plastic pieces excluding PVC; black-colored plastic pieces; combinations of #3-#7 type plastics that contain a specified combination of organic and inorganic molecules; combinations of one or more different types of multi-layer polymer films; combinations of specified plastics that do not contain a specified contaminant or additive; any types of plastics with a melting point greater than a specified threshold; any thermoset plastic of a plurality of specified types; specified plastics that do not contain chlorine; combinations of plastics having similar densities; combinations of plastics having similar polarities; plastic bottles without attached caps or vice versa.

As used herein, the term "predetermined" refers to something that has been established or decided in advance.

As used herein, "spectral imaging" is imaging that uses multiple bands across the electromagnetic spectrum. While a typical camera captures light across three wavelength bands in the visible spectrum, red, green, and blue (RGB), spectral imaging encompasses a wide variety of techniques that include and go beyond RGB. For example, spectral imaging may use the infrared, visible, ultraviolet, and/or x-ray spectrums, or some combination of the above. Spectral data, or spectral image data, is a digital data representation of a spectral image. Spectral imaging may include the acquisition of spectral data in visible and non-visible bands simultaneously, illumination from outside the visible range, or the use of optical filters to capture a specific spectral range. It is also possible to capture hundreds of wavelength bands for each pixel in a spectral image.

As used herein, the term "image data packet" refers to a packet of digital data pertaining to a captured spectral image of an individual material piece.

As used herein, the terms "identify" and "classify," the terms "identification" and "classification," and any derivatives of the foregoing, may be utilized interchangeably. As used herein, to "classify" a piece of material is to determine (i.e., identify) a type or class of materials to which the piece of material belongs. For example, in accordance with certain embodiments of the present disclosure, a sensor system (as further described herein) may be configured to collect and analyze any type of information for classifying materials, which classifications can be utilized within a sorting system to selectively sort material pieces as a function of a set of one or more physical and/or chemical characteristics (e.g., which may be user-defined), including but not limited to, color, texture, hue, shape, brightness, weight, density, chemical composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces.

The types or classes (i.e., classification) of materials may be user-definable and not limited to any known classification of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific types of plastic, where the granularity of such types or classes is relatively fine. Thus, the types or classes may be configured to distinguish between materials of significantly different chemical compositions such as, for example, plastics and metal alloys, or to distinguish between materials of almost identical chemical compositions such as, for example, different types of metal alloys. It should be appreciated that the methods and systems discussed herein may be applied to accurately identify/classify pieces of material for which the chemical composition is completely unknown before being classified.

As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been forged, a material removal process, etc.

As referred to herein, a "conveyor system" may be any known piece of mechanical handling equipment that moves materials from one location to another, including, but not limited to, an aero-mechanical conveyor, automotive conveyor, belt conveyor, belt-driven live roller conveyor, bucket conveyor, chain conveyor, chain-driven live roller conveyor, drag conveyor, dust-proof conveyor, electric track vehicle system, flexible conveyor, gravity conveyor, gravity skatewheel conveyor, lineshaft roller conveyor, motorized-drive roller conveyor, overhead I-beam conveyor, overland conveyor, pharmaceutical conveyor, plastic belt conveyor, pneumatic conveyor, screw or auger conveyor, spiral conveyor, tubular gallery conveyor, vertical conveyor, vibrating conveyor, and wire mesh conveyor.

The material sorting systems described herein according to certain embodiments of the present disclosure receive a heterogeneous mixture of a plurality of material pieces, wherein at least one material within this heterogeneous mixture includes a composition of one or more elements (e.g., a contaminant) Though all embodiments of the present disclosure may be utilized to sort any types or classes of materials as defined herein, certain embodiments of the present disclosure are hereinafter described for sorting material pieces containing one or more specified contaminants (which includes a contaminant embedded, coupled, or attached to the material piece) from other material pieces not containing such contaminant(s). In one non-limiting example, a piece of ferrous material (e.g., steel or iron) containing a tramp element (e.g., copper) is classified and separated (sorted) from pieces of ferrous materials not containing the tramp element. Furthermore, the pieces containing a contaminant(s) may otherwise be homogeneous with the pieces not containing the contaminant(s) (e.g., otherwise identified as all being within the same classification).

It should be noted that the materials to be sorted may have irregular sizes and shapes (e.g., see FIGS. 2-5 and 8-9). For example, such material (e.g., Heavies, Zorba, and/or Twitch) may have been previously run through some sort of shredding mechanism that chops up the materials into such irregularly shaped and sized pieces (producing scrap pieces), which may then be deposited or diverted onto a conveyor system.

Embodiments of the present disclosure will be described herein as sorting material pieces into such separate groups by physically depositing (e.g., diverting or ejecting) the material pieces into separate receptacles or bins, or onto another conveyor system, as a function of user-defined classifications or groupings (e.g., material pieces containing one or more specified contaminants) As an example, within certain embodiments of the present disclosure, material pieces may be sorted into separate receptacles in order to separate material pieces having physical characteristics (e.g., containing copper) that are distinguishable from the physical characteristics of other material pieces (e.g., visually discernible characteristics or features indicating the presence of one or more contaminants, different chemical signatures, etc.).

FIG. 1 illustrates an example of a system 100 configured in accordance with various embodiments of the present disclosure. A conveyor system 103 may be implemented to convey individual material pieces 101 through the system 100 so that each of the individual material pieces 101 can be tracked, classified, and/or sorted into predetermined desired groups. Such a conveyor system 103 may be implemented with one or more conveyor belts on which the material pieces 101 travel, typically at a predetermined constant speed. However, certain embodiments of the present disclosure may be implemented with other types of conveyor systems, including a system in which the material pieces free fall past the various components of the system 100 (or any other type of vertical sorter), or a vibrating conveyor system. Hereinafter, wherein applicable, the conveyor system 103 may also be referred to as the conveyor belt 103. In one or more embodiments, some or all of the acts or functions of conveying, capturing, stimulating, detecting, classifying, and sorting may be performed automatically, i.e., without human intervention. For example, in the system 100, one or more cameras, one or more sources of stimuli, one or more emissions detectors, a classification module, a sorting apparatus, and/or other system components may be configured to perform these and other operations automatically.

Furthermore, though FIG. 1 illustrates a single stream of material pieces 101 on a conveyor system 103, embodiments of the present disclosure may be implemented in which a plurality of such streams of material pieces are passing by the various components of the system 100 in parallel with each other. For example, as further described in U.S. Pat. No. 10,207,296, the material pieces may be distributed into two or more parallel singulated streams travelling on a single conveyor belt, or a set of parallel conveyor belts. As such, certain embodiments of the present disclosure are capable of simultaneously tracking, classifying, and sorting a plurality of such parallel travelling streams of material pieces. In accordance with certain embodiments of the present disclosure, incorporation or use of a singulator is not required. Instead, the conveyor system (e.g., the conveyor belt 103) may simply convey a collection of material pieces, which may have been deposited onto the conveyor system 103 in a random manner.

In accordance with certain embodiments of the present disclosure, some sort of suitable feeder mechanism (e.g., another conveyor system or hopper 102) may be utilized to feed the material pieces 101 onto the conveyor system 103, whereby the conveyor system 103 conveys the material pieces 101 past various components within the system 100. After the material pieces 101 are received by the conveyor system 103, an optional tumbler/vibrator/singulator 106 may be utilized to separate the individual material pieces from a mass of material pieces. Within certain embodiments of the present disclosure, the conveyor system 103 is operated to travel at a predetermined speed by a conveyor system motor 104. This predetermined speed may be programmable and/or adjustable by the operator in any well-known manner.

Monitoring of the predetermined speed of the conveyor system 103 may alternatively be performed with a position detector 105. Within certain embodiments of the present disclosure, control of the conveyor system motor 104 and/or the position detector 105 may be performed by an automation control system 108. Such an automation control system 108 may be operated under the control of a computer system 107, and/or the functions for performing the automation control may be implemented in software within the computer system 107.

The conveyor system 103 may be a conventional endless belt conveyor employing a conventional drive motor 104 suitable to move the belt conveyor at the predetermined speeds. The position detector 105, which may be a conventional encoder, may be operatively coupled to the conveyor system 103 and the automation control system 108 to provide information corresponding to the movement (e.g., speed) of the conveyor belt. Thus, through utilization of the controls to the conveyor system drive motor 104 and/or the automation control system 108 (and alternatively including the position detector 105), as each of the material pieces 101 travelling on the conveyor system 103 are identified, they can be tracked by location and time (relative to the various components of the system 100) so that various components of the system 100 can be activated/deactivated as each material piece 101 passes within their vicinity. As a result, the automation control system 108 is able to track the location of each of the material pieces 101 while they travel along the conveyor system 103.

Referring again to FIG. 1, certain embodiments of the present disclosure may utilize a vision, or optical recognition, system 110 and/or a material piece tracking device 111 as a means to track each of the material pieces 101 as they travel on the conveyor system 103. The vision system 110 may utilize one or more still or live action cameras 109 to note the position (i.e., location and timing) of each of the material pieces 101 on the moving conveyor system 103. The vision system 110 may be further, or alternatively, configured to perform certain types of identification (e.g., classification) of all or a portion of the material pieces 101, as will be further described herein. For example, such a vision system 110 may be utilized to capture or acquire information about each of the material pieces 101. For example, the vision system 110 may be configured (e.g., with an artificial intelligence ("AI") system) to capture or collect any type of information from the material pieces that can be utilized within the system 100 to classify and/or selectively sort the material pieces 101 as a function of a set of one or more characteristics (e.g., physical and/or chemical and/or radioactive, etc.) as described herein. In accordance with certain embodiments of the present disclosure, the vision system 110 may be configured to capture visual images of each of the material pieces 101 (including one-dimensional, two-dimensional, three-dimensional, or holographic imaging), for example, by using an optical sensor as utilized in typical digital cameras and video equipment. Such visual images captured by the optical sensor are then stored in a memory device as image data (e.g., formatted as image data packets). In accordance with certain embodiments of the present disclosure, such image data may represent images captured within optical wavelengths of light (i.e., the wavelengths of light that are observable by the typical human eye). However, alternative embodiments of the present disclosure may utilize sensor systems that are configured to capture an image of a material made up of wavelengths of light outside of the visual wavelengths of the human eye.

In accordance with certain embodiments of the present disclosure, the system 100 may be implemented with one or more sensor systems 120, which may be utilized solely or in combination with the vision system 110 to classify/identify material pieces 101. A sensor system 120 may be configured with any type of sensor technology, including sensors utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), X-Ray Transmission ("XRT"), Gamma Ray, Ultraviolet ("UV"), X-Ray Fluorescence ("XRF"), Laser Induced Breakdown Spectroscopy ("LIBS"), Raman Spectroscopy, Anti-stokes Raman Spectroscopy, Gamma Spectroscopy, Hyperspectral Spectroscopy (e.g., any range beyond visible wavelengths), Acoustic Spectroscopy, NMR Spectroscopy, Microwave Spectroscopy, Terahertz Spectroscopy, including one-dimensional, two-dimensional, or three-dimensional imaging with any of the foregoing), or by any other type of sensor technology, including but not limited to, chemical or radioactive. Implementation of an XRF system (e.g., for use as a sensor system 120 herein) is further described in U.S. Pat. No. 10,207,296. XRF can be used within certain embodiments of the present disclosure to identify inorganic materials within a plastic piece (e.g., for inclusion within a chemical signature).

The following sensor systems may also be used within certain embodiments of the present disclosure for determining the chemical signatures of plastic pieces and/or classifying plastic pieces for sorting. The previously disclosed various forms of infrared spectroscopy may be utilized to obtain a chemical signature specific of each plastic piece that provides information about the base polymer of any plastic material, as well as other components present in the material (mineral fillers, copolymers, polymer blends, etc.). Differential Scanning calorimetry ("DSC") is a thermal analysis technique that obtains the thermal transitions produced during the heating of the analyzed material specific for each material. Thermogravimetric analysis ("TGA") is another thermal analysis technique resulting in quantitative information about the composition of a plastic material regarding polymer percentages, other organic components, mineral fillers, carbon black, etc. Capillary and rotational rheometry can determine the rheological properties of polymeric materials by measuring their creep and deformation resistance. Optical and scanning electron microscopy ("SEM") can provide information about the structure of the materials analyzed regarding the number and thickness of layers in multilayer materials (e.g., multilayer polymer films), dispersion size of pigment or filler particles in the polymeric matrix, coating defects, interphase morphology between components, etc. Chromatography (e.g., LC-PDA, LC-MS, LC-LS, GC-MS, GC-FID, HS-GC) can quantify minor components of plastic materials, such as UV stabilizers, antioxidants, plasticizers, anti-slip agents, etc., as well as residual monomers, residual solvents from inks or adhesives, degradation substances, etc.

It should be noted that though FIG. 1 is illustrated with a combination of a vision system 110 and one or more sensor systems 120, embodiments of the present disclosure may be implemented with any combination of sensor systems utilizing any of the sensor technologies disclosed herein, or any other sensor technologies currently available or developed in the future. Though FIG. 1 is illustrated as including one or more sensor systems 120, implementation of such sensor system(s) is optional within certain embodiments of the present disclosure. Within certain embodiments of the present disclosure, a combination of both the vision system 110 and one or more sensor systems 120 may be used to classify the material pieces 101. Within certain embodiments of the present disclosure, any combination of one or more of the different sensor technologies disclosed herein may be used to classify the material pieces 101 without utilization of a vision system 110. Furthermore, embodiments of the present disclosure may include any combinations of one or more sensor systems and/or vision systems in which the outputs of such sensor/vision systems are processed within an AI system (as further disclosed herein) in order to classify/identify materials from a heterogeneous mixture of materials, which can then be sorted from each other.

In accordance with certain embodiments of the present disclosure, a vision system 110 and/or sensor system(s) may be configured to identify which of the material pieces 101 contain a contaminant (e.g., steel or iron pieces containing copper; plastic pieces containing a specific contaminant, additive, or undesirable physical feature (e.g., an attached container cap formed of a different type of plastic than the container)), and send a signal to separate such material pieces (e.g., from those not containing the contaminant). In such a configuration, the identified material pieces 101 may be diverted/ejected utilizing one of the mechanisms as described hereinafter for physically diverting sorted material pieces into individual receptacles.

Within certain embodiments of the present disclosure, the material piece tracking device 111 and accompanying control system 112 may be utilized and configured to measure the sizes and/or shapes of each of the material pieces 101 as they pass within proximity of the material piece tracking device 111, along with the position (i.e., location and timing) of each of the material pieces 101 on the moving conveyor system 103. An exemplary operation of such a material piece tracking device 111 and control system 112 is further described in U.S. Pat. No. 10,207,296. Alternatively, as previously disclosed, the vision system 110 may be utilized to track the position (i.e., location and timing) of each of the material pieces 101 as they are transported by the conveyor system 103. As such, certain embodiments of the present disclosure may be implemented without a material piece tracking device (e.g., the material piece tracking device 111) to track the material pieces.

Within certain embodiments of the present disclosure that implement one or more sensor systems 120, the sensor system(s) 120 may be configured to assist the vision system 110 to identify the chemical composition, relative chemical compositions, and/or manufacturing types of each of the material pieces 101 as they pass within proximity of the sensor system(s) 120. The sensor system(s) 120 may include an energy emitting source 121, which may be powered by a power supply 122, for example, in order to stimulate a response from each of the material pieces 101.

Within certain embodiments of the present disclosure, as each material piece 101 passes within proximity to the emitting source 121, the sensor system 120 may emit an appropriate sensing signal towards the material piece 101. One or more detectors 124 may be positioned and configured to sense/detect one or more characteristics from the material piece 101 in a form appropriate for the type of utilized sensor technology. The one or more detectors 124 and the associated detector electronics 125 capture these received sensed characteristics to perform signal processing thereon and produce digitized information representing the sensed characteristics (e.g., spectral data), which is then analyzed in accordance with certain embodiments of the present disclosure, which may be used to classify each of the material pieces 101. This classification, which may be performed within the computer system 107, may then be utilized by the automation control system 108 to activate one of the N (N≥1) sorting devices 126 . . . 129 of a sorting apparatus for sorting (e.g., diverting/ejecting) the material pieces 101 into one or more N (N≥1) sorting receptacles 136 . . . 139 according to the determined classifications. Four sorting devices 126 . . . 129 and four sorting receptacles 136 . . . 139 associated with the sorting devices are illustrated in FIG. 1 as merely a non-limiting example.

The sorting devices may include any well-known mechanisms for redirecting selected material pieces 101 towards a desired location, including, but not limited to, diverting the material pieces 101 from the conveyor belt system into the plurality of sorting receptacles. For example, a sorting device may utilize air jets, with each of the air jets assigned to one or more of the classifications. When one of the air jets (e.g., 127) receives a signal from the automation control system 108, that air jet emits a stream of air that causes a material piece 101 to be diverted/ejected from the conveyor system 103 into a sorting receptacle (e.g., 137) corresponding to that air jet. High speed air valves from Mac Industries may be used, for example, to supply the air jets with an appropriate air pressure configured to divert/eject the material pieces 101 from the conveyor system 103.

Although the example illustrated in FIG. 1 uses air jets to divert/eject material pieces, other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to separate the material pieces into separate receptacles as they fall from the edge of the conveyor belt. A pusher device, as that term is used herein, may refer to any form of device which may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism. Some embodiments may include multiple pusher devices located at different locations and/or with different diversion path orientations along the path of the conveyor system. In various different implementations, these sorting systems describe herein may determine which pusher device to activate (if any) depending on characteristics of material pieces identified by the machine learning system. Moreover, the determination of which pusher device to activate may be based on the detected presence and/or characteristics of other objects that may also be within the diversion path of a pusher device concurrently with a target item. Furthermore, even for facilities where singulation along the conveyor system is not perfect, the disclosed sorting systems can recognize when multiple objects are not well singulated, and dynamically select from a plurality of pusher devices which should be activated based on which pusher device provides the best diversion path for potentially separating objects within close proximity In some embodiments, objects identified as target objects may represent material that should be diverted off of the conveyor system. In other embodiments, objects identified as target objects represent material that should be allowed to remain on the conveyor system so that non-target materials are instead diverted.

In addition to the N sorting receptacles 136 . . . 139 into which material pieces 101 are diverted/ejected, the system 100 may also include a receptacle 140 that receives material pieces 101 not diverted/ejected from the conveyor system 103 into any of the aforementioned sorting receptacles 136 . . . 139. For example, a material piece 101 may not be diverted/ejected from the conveyor system 103 into one of the N sorting receptacles 136 . . . 139 when the classification of the material piece 101 is not determined (or simply because the sorting devices failed to adequately divert/eject a piece). Thus, the receptacle 140 may serve as a default receptacle into which unclassified material pieces are dumped. Alternatively, the receptacle 140 may be used to receive one or more classifications of material pieces that have deliberately not been assigned to any of the N sorting receptacles 136 . . . 139. These such material pieces may then be further sorted in accordance with other characteristics and/or by another sorting system.

Depending upon the variety of classifications of material pieces desired, multiple classifications may be mapped to a single sorting device and associated sorting receptacle. In other words, there need not be a one-to-one correlation between classifications and sorting receptacles. For example, it may be desired by the user to sort certain classifications of materials into the same sorting receptacle (e.g., material pieces containing a specified contaminant). To accomplish this sort, when a material piece 101 is classified as falling into a predetermined grouping of classifications, the same sorting device may be activated to sort these into the same sorting receptacle. Such combination sorting may be applied to produce any desired combination of sorted material pieces. The mapping of classifications may be programmed by the user (e.g., using the sorting algorithm (e.g., see FIG. 6) operated by the computer system 107) to produce such desired combinations. Additionally, the classifications of material pieces are user-definable, and not limited to any particular known classifications of material pieces.

The conveyor system 103 may include a circular conveyor (not shown) so that unclassified material pieces are returned to the beginning of the system 100 and run through the system 100 again. Moreover, because the system 100 is able to specifically track each material piece 101 as it travels on the conveyor system 103, some sort of sorting device (e.g., the sorting device 129) may be implemented to direct/eject a material piece 101 that the system 100 has failed to classify after a predetermined number of cycles through the system 100 (or the material piece 101 is collected in receptacle 140).

The systems and methods described herein may be applied to classify and/or sort individual material pieces having any of a variety of sizes as small as a ¼ inch in diameter or less. Even though the systems and methods described herein are described primarily in relation to sorting individual material pieces of a singulated stream one at a time, the systems and methods described herein are not limited thereto. Such systems and methods may be used to stimulate and/or detect emissions from a plurality of materials concurrently. For example, as opposed to a singulated stream of materials being conveyed along one or more conveyor belts in series, multiple singulated streams may be conveyed in parallel. Each stream may be on a same belt or on different belts arranged in parallel. Further, pieces may be randomly distributed on (e.g., across and along) one or more conveyor belts. Accordingly, the systems and methods described herein may be used to stimulate, and/or detect emissions from, a plurality of these small pieces at the same time. In other words, a plurality of small pieces may be treated as a single piece as opposed to each small piece being considered individually. Accordingly, the plurality of small pieces of material may be classified and sorted (e.g., diverted/ejected from the conveyor system) together. It should be appreciated that a plurality of larger material pieces also may be treated as a single material piece.

As previously noted, certain embodiments of the present disclosure may implement one or more vision systems (e.g., vision system 110) in order to identify, track, and/or classify material pieces. In accordance with embodiments of the present disclosure, such a vision system(s) may operate alone to identify and/or classify and sort material pieces, or may operate in combination with a sensor system (e.g., sensor system 120) to identify and/or classify and sort material pieces. If a sorting system (e.g., system 100) is configured to operate solely with such a vision system(s) 110, then the sensor system 120 may be omitted from the system 100 (or simply deactivated).

Such a vision system may be configured with one or more devices for capturing or acquiring images of the material pieces as they pass by on a conveyor system. The devices may be configured to capture or acquire any desired range of wavelengths irradiated or reflected by the material pieces, including, but not limited to, visible, infrared ("IR"), ultraviolet ("UV") light. For example, the vision system may be configured with one or more cameras (still and/or video, either of which may be configured to capture two-dimensional, three-dimensional, and/or holographical images) positioned in proximity (e.g., above) the conveyor system so that images of the material pieces are captured as they pass by the sensor system(s). In accordance with alternative embodiments of the present disclosure, data captured by a sensor system 120 may be processed (converted) into data to be utilized (either solely or in combination with the image data captured by the vision system 110) for classifying/sorting of the material pieces. Such an implementation may be in lieu of, or in combination with, utilizing the sensor system 120 for classifying material pieces.

Regardless of the type(s) of sensed characteristics/information captured of the material pieces, the information may then be sent to a computer system (e.g., computer system 107) to be processed (e.g., by an AI system) in order to identify and/or classify each of the material pieces. An AI system may implement any well-known AI system (e.g., Artificial Narrow Intelligence ("ANI"), Artificial General Intelligence ("AGI"), and Artificial Super Intelligence ("ASI")), a machine learning system including one that implements a neural network (e.g., artificial neural network, deep neural network, convolutional neural network, recurrent neural network, autoencoders, reinforcement learning, etc.), a machine learning system implementing supervised learning, unsupervised learning, semi-supervised learning, reinforcement learning, self learning, feature learning, sparse dictionary learning, anomaly detection, robot learning, association rule learning, fuzzy logic, deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, certain types of machine learning may be performed in two stages. For example, first, training occurs, which may be performed offline in that the system 100 is not being utilized to perform actual classifying/sorting of material pieces. The system 100 may be utilized to train the machine learning system in that homogenous sets (also referred to herein as control samples) of material pieces (i.e., having the same types or classes of materials, or falling within the same predetermined fraction) are passed through the system 100 (e.g., by a conveyor system 103); and all such material pieces may not be sorted, but may be collected in a common receptacle (e.g., receptacle 140). Alternatively, the training may be performed at another location remote from the system 100, including using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s)), creating a knowledge base for later classification of a heterogeneous mixture of material pieces received by the system 100, which may then be sorted by desired classifications. Such a knowledge base may include one or more libraries, wherein each library includes parameters (e.g., neural network parameters) for utilization by the machine learning system in classifying material pieces. For example, one particular library may include parameters configured by the training stage to recognize and classify a particular type or class of material, or one or more material that fall with a predetermined fraction. In accordance with certain embodiments of the present disclosure, such libraries may be inputted into the machine learning system and then the user of the system 100 may be able to adjust certain ones of the parameters in order to adjust an operation of the system 100 (for example, adjusting the threshold effectiveness of how well the machine learning system recognizes a particular material piece from a heterogeneous mixture of materials).

Additionally, the inclusion of certain materials (e.g., one or more contaminants) in material pieces (e.g., ferrous metals, steel scrap, etc.), or combinations of certain contaminants, result in identifiable physical features (e.g., visually discernible characteristics) in materials. As a result, when a plurality of material pieces containing such a particular composition are passed through the aforementioned training stage, the machine learning system can learn how to distinguish such material pieces from others. Consequently, a machine learning system configured in accordance with certain embodiments of the present disclosure may be configured to sort between material pieces as a function of their respective material/chemical compositions. For example, such a machine learning system may be configured so that material pieces containing copper can be sorted as a function of the percentage of copper contained within the material pieces.

Figure 2:
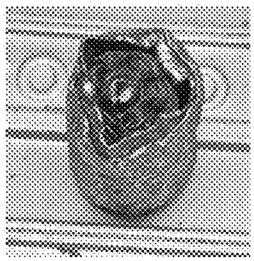
FIGS. 2-3 show two different orientations of captured or acquired images of an exemplary material piece containing copper.
Figure 3:
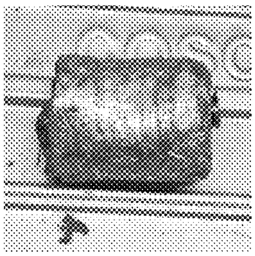
Figure 4:
FIGS. 4-5 show two different orientations of captured or acquired images of another exemplary material piece containing copper.
Figure 5:
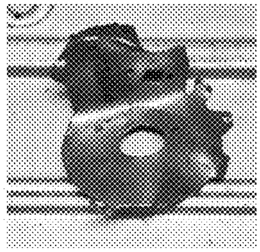

For example, FIGS. 2-3 show two different orientations of captured or acquired images of an exemplary material piece containing copper, which may be used during the aforementioned training stage. FIGS. 4-5 show two different orientations of captured or acquired images of another exemplary material piece containing copper, which may be used during the aforementioned training stage. The copper may be sensed by any appropriate sensor system disclosed herein, including by the vision system identifying material pieces containing copper due to the different color of the copper relative to the remainder of the material piece.

During the training stage, a plurality of material pieces of one or more specific types, classifications, or fractions of material(s), which are the control samples, may be delivered past the vision system and/or one or more sensor systems(s) (e.g., by a conveyor system) so that the algorithms within the machine learning system detect, extract, and learn what features represent such a type or class of material. For example, each of the material pieces containing copper (e.g., such as shown in FIGS. 2-5) may be first passed through such a training stage so that the algorithms within the machine learning system "learn" (are trained) how to detect, recognize, and classify material pieces containing copper. In the case of training a vision system (e.g., the vision system 110), trained to visually discern between material pieces. This creates a library of parameters particular to material pieces containing copper. The same process can be performed with respect to images of any variety of material pieces containing any type of contaminant creating a library of parameters particular to material pieces containing that particular type of contaminant. For each type of material to be classified by the vision system, any number of exemplary material pieces of that type of material may be passed by the vision system. Given captured sensed information as input data, the algorithms within the machine learning system may use N classifiers, each of which test for one of N different material types. Note that the machine learning system may be "taught" (trained) to detect any type, class, or fraction of material, including any of the types, classes, or fractions materials found within MSW, or any other material disclosed herein.

After the algorithms have been established and the machine learning system has sufficiently learned (been trained) the differences (e.g., visually discernible differences) for the material classifications (e.g., within a user-defined level of statistical confidence), the libraries for the different material classifications are then implemented into a material classifying/sorting system (e.g., system 100) to be used for identifying and/or classifying material pieces from a heterogeneous mixture of material pieces, and then possibly sorting such classified material pieces if sorting is to be performed.

Techniques to construct, optimize, and utilize an AI system are known to those of ordinary skill in the art as found in relevant literature. Examples of such literature include the publications: Krizhevsky et al., "*ImageNet Classification with Deep Convolutional Networks*," Proceedings of the 25th International Conference on Neural Information Processing Systems, December 3-6, 2012, Lake Tahoe, Nev., and LeCun et al., "*Gradient-Based Learning Applied to Document Recognition*," Proceedings of the IEEE, Institute of Electrical and Electronic Engineers (IEEE), November 1998, both of which are hereby incorporated by reference herein in their entirety.

In an example technique, data captured by a vision or sensor system with respect to a particular material piece (e.g., containing one or more specific types of contaminants) may be processed as an array of data values (within a data processing system (e.g., the data processing system 3400 of FIG. 10) implementing (configured with) an AI system). For example, the data may be spectral data captured by a digital camera or other type of sensor system with respect to a particular material piece and processed as an array of data values (e.g., image data packets). Each data value may be represented by a single number, or as a series of numbers representing values. These values may be multiplied by neuron weight parameters (e.g., with a neural network), and may possibly have a bias added. This may be fed into a neuron nonlinearity. The resulting number output by the neuron can be treated much as the values were, with this output multiplied by subsequent neuron weight values, a bias optionally added, and once again fed into a neuron nonlinearity. Each such iteration of the process is known as a "layer" of the neural network. The final outputs of the final layer may be interpreted as probabilities that a material is present or absent in the captured data pertaining to the material piece. Examples of such a process are described in detail in both of the previously noted "*ImageNet Classification with Deep Convolutional Networks*" and "*Gradient-Based Learning Applied to Document Recognition*" references.

In accordance with certain embodiments of the present disclosure in which a neural network is implemented, as a final layer (the "classification layer") the final set of neurons' output is trained to represent the likelihood a material piece (e.g., one containing a contaminant) is associated with the captured data. During operation, if the likelihood that a material piece is associated with the captured data is over a user-specified threshold, then it is determined that the particular material piece is indeed associated with the captured data. These techniques can be extended to determine not only the presence of a type of material associated with particular captured data, but also whether sub-regions of the particular captured data belong to one type of material or another type of material. This process is known as segmentation, and techniques to use neural networks exist in the literature, such as those known as "fully convolutional" neural networks, or networks that otherwise include a convolutional portion (i.e., are partially convolutional), if not fully convolutional. This allows for material location and size to be determined.

It should be understood that the present disclosure is not exclusively limited to AI techniques. Other common techniques for material classification/identification may also be used. For instance, a sensor system may utilize optical spectrometric techniques using multi- or hyper-spectral cameras to provide a signal that may indicate the presence or absence of a type, class, or fraction of material (e.g., containing one or more specific types of contaminants) by examining the spectral emissions (i.e., spectral imaging) of the material. Spectral images of a material piece (i.e., containing one or more specific types of contaminants) may also be used in a template-matching algorithm, wherein a database of spectral images is compared against an acquired spectral image to find the presence or absence of certain types of materials from that database. A histogram of the captured spectral image may also be compared against a database of histograms. Similarly, a bag of words model may be used with a feature extraction technique, such as scale-invariant feature transform ("SIFT"), to compare extracted features between a captured spectral image and those in a database.

Therefore, as disclosed herein, certain embodiments of the present disclosure provide for the identification/classification of one or more different types, classes, or fractions of materials in order to determine which material pieces should be diverted from a conveyor system in defined groups. In accordance with certain embodiments, AI techniques are utilized to train (i.e., configure) a neural network to identify a variety of one or more different types, classes, or fractions of materials. Spectral images, or other types of sensed information, are captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection receptacle, or diverted onto another conveyor system).

In accordance with certain embodiments of the present disclosure, an AI system for an existing installation (e.g., the system 100) may be dynamically reconfigured to identify/classify characteristics of a new material (e.g., a new or different contaminant) by replacing a current set of neural network parameters with a new set of neural network parameters.

One point of mention here is that, in accordance with certain embodiments of the present disclosure, the detected/captured features/characteristics (e.g., spectral images) of the material pieces may not be necessarily simply particularly identifiable or discernible physical characteristics; they can be abstract formulations that can only be expressed mathematically, or not mathematically at all; nevertheless, the AI system may be configured to parse the spectral data to look for patterns that allow the control samples to be classified during the training stage. Furthermore, the AI system may take subsections of captured information (e.g., spectral images) of a material piece and attempt to find correlations between the predefined classifications.

In accordance with certain embodiments of the present disclosure, instead of utilizing a training stage whereby control samples of material pieces are passed by the vision system and/or sensor system(s), training of the AI system may be performed utilizing a labeling/annotation technique (or any other supervised learning technique) whereby as data/information of material pieces (e.g., containing one or more particular types of contaminant) are captured by a vision/sensor system, a user inputs a label or annotation that identifies each material piece, which is then used to create the library for use by the AI system when classifying material pieces within a heterogenous mixture of material pieces.

In accordance with certain embodiments of the present disclosure, any sensed characteristics output by any of the sensor systems 120 disclosed herein may be input into an AI system in order to classify and/or sort materials. For example, in an AI system implementing supervised learning, sensor system 120 outputs that uniquely characterize a particular type or composition of material (e.g., a specific contaminant) may be used to train the AI system.

Figure 6:
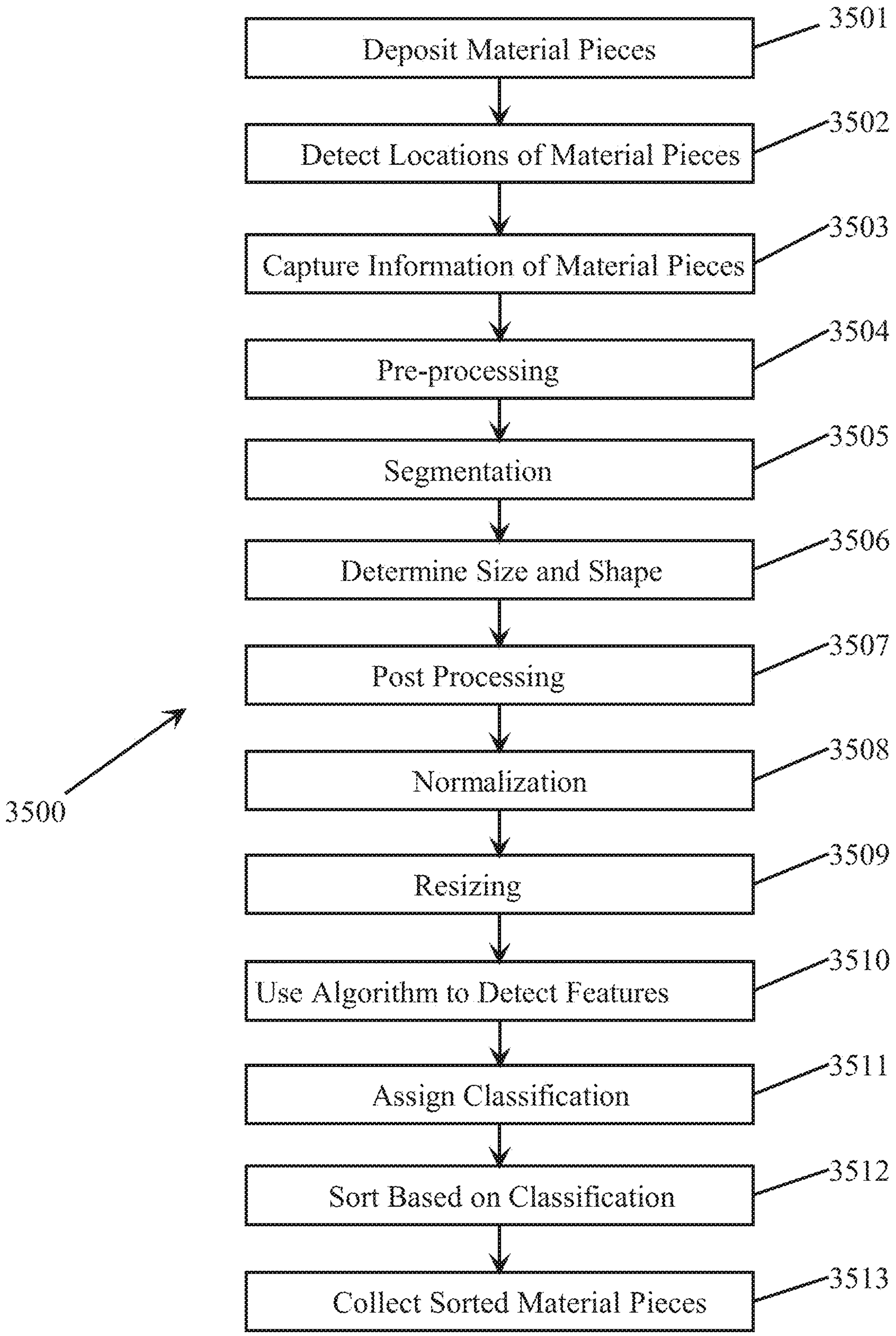
FIG. 6 illustrates a flowchart diagram configured in accordance with embodiments of the present disclosure.

FIG. 6 illustrates a flowchart diagram depicting exemplary embodiments of a process 3500 of classifying/sorting material pieces utilizing a vision system and/or one or more sensor systems in accordance with certain embodiments of the present disclosure. The process 3500 may be performed to classify a heterogeneous mixture of plastic pieces into any combination of predetermined types, classes, and/or fractions. The process 3500 may be configured to operate within any of the embodiments of the present disclosure described herein, including the system 100 of FIG. 1. Operation of the process 3500 may be performed by hardware and/or software, including within a computer system (e.g., computer system 3400 of FIG. 10) controlling the system (e.g., the computer system 107, the vision system 110, and/or the sensor system(s) 120 of FIG. 1). In the process block 3501, the material pieces may be deposited onto a conveyor system. In the process block 3502, the location on the conveyor system of each material piece is detected for tracking of each material piece as it travels through the system 100. This may be performed by the vision system 110 (for example, by distinguishing a material piece from the underlying conveyor system material while in communication with a conveyor system position detector (e.g., the position detector 105)). Alternatively, a material piece tracking device 111 can be used to track the pieces. Or, any system that can create a light source (including, but not limited to, visual light, UV, and IR) and have a detector that can be used to locate the pieces. In the process block 3503, when a material piece has traveled in proximity to one or more of the vision system and/or the sensor system(s), sensed information/characteristics of the material piece is captured/acquired. In the process block 3504, a vision system (e.g., implemented within the computer system 107), such as previously disclosed, may perform pre-processing of the captured information, which may be utilized to detect (extract) information of each of the material pieces (e.g., from the background (e.g., the conveyor belt); in other words, the pre-processing may be utilized to identify the difference between the material piece and the background). Well-known image processing techniques such as dilation, thresholding, and contouring may be utilized to identify the material piece as being distinct from the background. In the process block 3505, segmentation may be performed. For example, the captured information may include information pertaining to one or more material pieces. Additionally, a particular material piece may be located on a seam of the conveyor belt when its image is captured. Therefore, it may be desired in such instances to isolate the image of an individual material piece from the background of the image. In an exemplary technique for the process block 3505, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background.

In the optional process block 3506, the material pieces may be conveyed along the conveyor system within proximity of a material piece tracking device and/or a sensor system in order to track each of the material pieces and/or determine a size and/or shape of the material pieces, which may be useful if an XRF system or some other spectroscopy sensor is also implemented within the sorting system. In the process block 3507, post processing may be performed. Post processing may involve resizing the captured information/data to prepare it for use in the neural networks. This may also include modifying certain properties (e.g., enhancing image contrast, changing the image background, or applying filters) in a manner that will yield an enhancement to the capability of the AI system to classify the material pieces. In the process block 3509, the data may be resized. Data resizing may be desired under certain circumstances to match the data input requirements for certain AI systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification. Thus, smaller data sizes can ultimately increase the throughput of the system 100 and increase its value.

In the process blocks 3510 and 3511, each material piece is identified/classified based on the sensed/detected features. For example, the process block 3510 may be configured with a neural network employing one or more algorithms, which compare the extracted features with those stored in a previously generated knowledge base (e.g., generated during a training stage), and assigns the classification with the highest match to each of the material pieces based on such a comparison. The algorithms may process the captured information/data in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting receptacles the respective material pieces should be sorted. For example, each of the N classifications may be assigned to one sorting receptacle, and the material piece under consideration is sorted into that receptacle that corresponds to the classification returning the highest probability larger than a predefined threshold. Within embodiments of the present disclosure, such predefined thresholds may be preset by the user. A particular material piece may be sorted into an outlier receptacle (e.g., sorting receptacle 140) if none of the probabilities is larger than the predetermined threshold.

Next, in the process block 3512, a sorting device corresponding to the classification, or classifications, of the material piece is activated (e.g., instructions sent to the sorting device to sort). Between the time at which the image of the material piece was captured and the time at which the sorting device is activated, the material piece has moved from the proximity of the vision system and/or sensor system(s) to a location downstream on the conveyor system (e.g., at the rate of conveying of a conveyor system). In embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within embodiments of the present disclosure, the activation of a sorting device may be timed by a respective position detector that detects when a material piece is passing before the sorting device and sends a signal to enable the activation of the sorting device. In the process block 3513, the sorting receptacle corresponding to the sorting device that was activated receives the diverted/ejected material piece.

Figure 7:
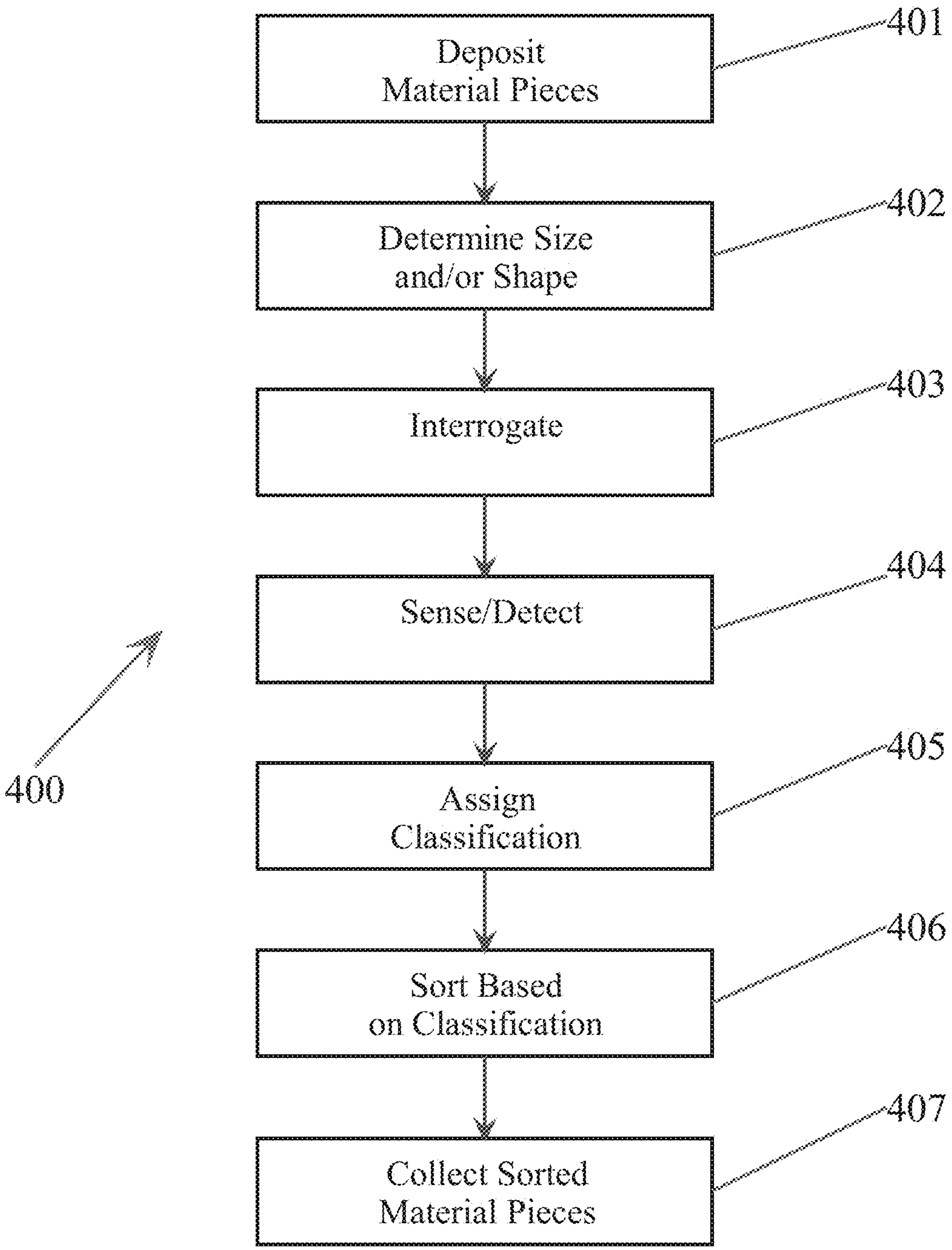
FIG. 7 illustrates a flowchart diagram configured in accordance with embodiments of the present disclosure.

FIG. 7 illustrates a flowchart diagram depicting exemplary embodiments of a process 400 of sorting material pieces in accordance with certain embodiments of the present disclosure. The process 400 may be configured to operate within any of the embodiments of the present disclosure described herein, including the system 100 of FIG. 1. The process 400 may be configured to operate in conjunction with the process 3500. For example, in accordance with certain embodiments of the present disclosure, the process blocks 403 and 404 may be incorporated in the process 3500 (e.g., operating in series or in parallel with the process blocks 3503-3510) in order to combine the efforts of a vision system 110 that is implemented in conjunction with an AI system with a sensor system (e.g., the sensor system 120) that is not implemented in conjunction with an AI system in order to classify and/or sort material pieces.

Operation of the process 400 may be performed by hardware and/or software, including within a computer system (e.g., computer system 3400 of FIG. 10) controlling the system (e.g., the computer system 107 of FIG. 1). In the process block 401, the material pieces may be deposited onto a conveyor system. Next, in the optional process block 402, the material pieces may be conveyed along the conveyor system within proximity of a material piece tracking device and/or an optical imaging system in order to track each material piece and/or determine a size and/or shape of the material pieces. In the process block 403, when a material piece has traveled in proximity of the sensor system, the material piece may be interrogated, or stimulated, with EM energy (waves) or some other type of stimulus appropriate for the particular type of sensor technology utilized by the sensor system. In the process block 404, physical characteristics of the material piece are sensed/detected and captured by the sensor system. In the process block 405, for at least some of the material pieces, the type of material is identified/classified based (at least in part) on the captured characteristics, which may be combined with the classification by the AI system in conjunction with the vision system 110.

Next, if sorting of the material pieces is to be performed, in the process block 406, a sorting device corresponding to the classification, or classifications, of the material piece is activated. Between the time at which the material piece was sensed and the time at which the sorting device is activated, the material piece has moved from the proximity of the sensor system to a location downstream on the conveyor system, at the rate of conveying of the conveyor system. In certain embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within certain embodiments of the present disclosure, the activation of a sorting device may be timed by a respective position detector that detects when a material piece is passing before the sorting device and sends a signal to enable the activation of the sorting device. In the process block 407, the sorting receptacle corresponding to the sorting device that was activated receives the diverted/ejected material piece.

In accordance with certain embodiments of the present disclosure, a plurality of at least a portion of the system 100 may be linked together in succession in order to perform multiple iterations or layers of sorting. For example, when two or more systems 100 are linked in such a manner, the conveyor system may be implemented with a single conveyor belt, or multiple conveyor belts, conveying the material pieces past a first vision system (and, in accordance with certain embodiments, a sensor system) configured for sorting material pieces of a first set of a heterogeneous mixture of materials by a sorter (e.g., the first automation control system 108 and associated one or more sorting devices 126 . . . 129) into a first set of one or more receptacles (e.g., sorting receptacles 136 . . . 139), and then conveying the material pieces past a second vision system (and, in accordance with certain embodiments, another sensor system) configured for sorting material pieces of a second set of a heterogeneous mixture of materials by a second sorter into a second set of one or more sorting receptacles. A further discussion of such multistage sorting is in U.S. published patent application no. 2022/0016675, which is hereby incorporated by reference herein.

Such successions of systems 100 can contain any number of such systems linked together in such a manner In accordance with certain embodiments of the present disclosure, each successive vision system may be configured to sort out a different classified or type of material (e.g., material pieces containing different contaminants) than the previous system (s).

In accordance with various embodiments of the present disclosure, different types or classes of materials may be classified by different types of sensors each for use with an AI system, and combined to classify material pieces in a stream of scrap or waste.

In accordance with various embodiments of the present disclosure, data (e.g., spectral data) from two or more sensors can be combined using a single or multiple AI systems to perform classifications of material pieces.

In accordance with various embodiments of the present disclosure, multiple sensor systems can be mounted onto a single conveyor system, with each sensor system utilizing a different AI system. In accordance with various embodiments of the present disclosure, multiple sensor systems can be mounted onto different conveyor systems, with each sensor system utilizing a different AI system.

Embodiments of the present disclosure are configured to remove contaminants (for example, but not limited to, copper, tin, nickel, chrome, and manganese, and any other tramp contaminants) from ferrous scrap (e.g., steel or iron). In accordance with certain embodiments of the present disclosure, a sorting system (e.g., the system 100) is configured to remove copper containing pieces (e.g., wires, transformers, motors, coils, windings, etc.) from scrap (e.g., ELVs). In accordance with alternative embodiments of the present disclosure, a sorting system is configured to combine a disclosed AI system with standard "meatball" removal equipment (e.g., as manufactured by Eriez Magnetics), which is being used by most shredders to remove large motors and alternators from ferrous scrap.

Certain embodiments of the present disclosure are configured to achieve a copper content of less than 1 wt % (e.g., as measured by an assay of molten steel) after sorting of the copper from the ferrous scrap.

Figure 8:
FIG. 8 shows an image of ferrous scrap (e.g., steel scrap) containing less than 0.05 wt % of copper after classifying and sorting out of material pieces containing copper in accordance with embodiments of the present disclosure.
Figure 9:
FIG. 9 shows an image of sorted-out material pieces containing copper.

FIG. 8 shows an image of ferrous scrap (e.g., steel scrap) containing less than 0.05 wt % of copper after the classifying and sorting out of material pieces containing copper (e.g., utilizing the system 100 and the process 3500 or the process 400). FIG. 9 shows an image of the sorted-out material pieces containing copper.

Figure 10:
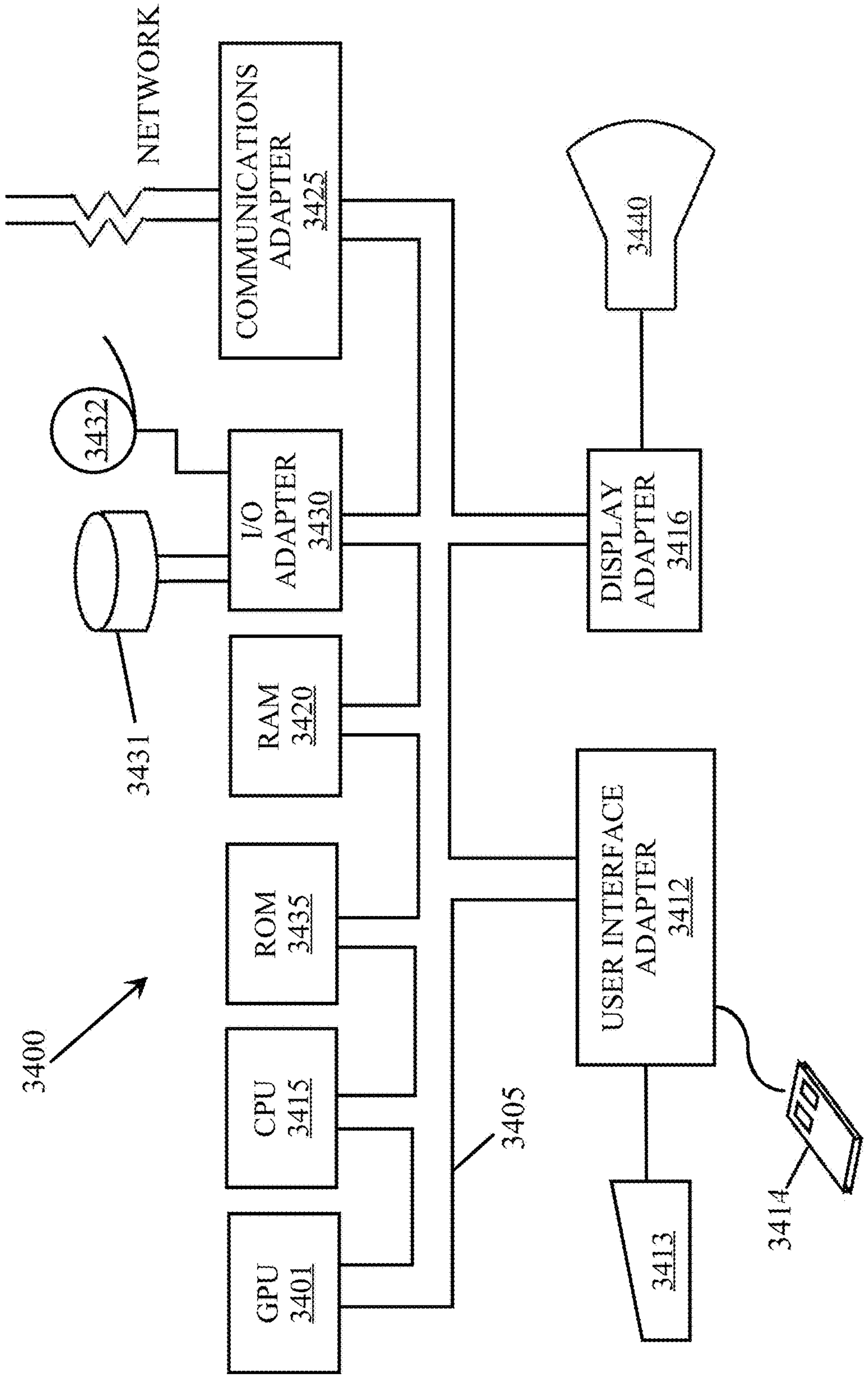
FIG. 10 illustrates a block diagram of a data processing system configured in accordance with embodiments of the present disclosure.

With reference now to FIG. 10, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the automation control system 108, aspects of the sensor system(s) 120, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e g, small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. In FIG. 10, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 10 may vary depending on the implementation. Other internal hardware or peripheral devices, such as flash ROM (or equivalent nonvolatile memory) or optical disk drives and the like, may be used in addition to or in place of the hardware depicted in FIG. 10. Also, any of the processes of the present disclosure may be applied to a multiprocessor computer system, or performed by a plurality of such systems 3400. For example, training of the vision system 110 may be performed by a first computer system 3400, while operation of the vision system 110 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 10 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, tracking, classifying, and/or sorting material pieces. Such functionalities may be implemented within hardware and/or software, such as within one or more data processing systems (e.g., the data processing system 3400 of FIG. 10), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. However, any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 10), a read-only memory ("ROM") (e.g., ROM 3435 of FIG. 10), an erasable programmable read-only memory ("EPROM" or flash memory), an optical fiber, a portable compact disc read-only memory ("CD-ROM"), an optical storage device, a magnetic storage device (e.g., hard drive 3431 of FIG. 10), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function (s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

In the description herein, a flow-charted technique may be described in a series of sequential actions. The sequence of the actions, and the element performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), and can also be performed in whole, in part, or any combination thereof.

Reference may be made herein to a device, circuit, circuitry, system, or module "configured to" perform a particular function or functions. It should be understood that this may include selecting predefined logic blocks and logically associating them, such that they provide particular logic functions, which includes monitoring or control functions. It may also include programming computer software-based logic, wiring discrete hardware components, or a combination of any or all of the foregoing.

To the extent not described herein, many details regarding specific materials, processing acts, and circuits are conventional, and may be found in textbooks and other sources within the computing, electronics, and software arts.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, programming languages such as MATLAB or LabVIEW, or any of the AI software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the AI system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, automation control system 108, the vision system 110, and aspects of the sensor system(s) 120.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., for each of the scrap pieces processed by a system described herein) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Aspects of the present disclosure provide a system for classifying a first mixture of material pieces composed of ferrous metals, wherein the system includes a sensor configured to capture one or more characteristics of the first mixture of material pieces composed of ferrous metals, and a data processing system that includes an artificial intelligence ("AI") system configured to classify one or more of the material pieces composed of ferrous metals as containing a tramp element based on the one or more captured characteristics of the first mixture of material pieces composed of ferrous metals. The system may further include a conveyor system configured to convey the first mixture past the sensor, and a sorter configured to sort the one or more classified material pieces from the first mixture as a function of the classifying of the one or more of the material pieces composed of ferrous metals as containing a tramp element. The classifying of one or more of the material pieces composed of ferrous metals as containing a tramp element may be based on a knowledge base containing a previously generated library of observed characteristics captured from samples of material pieces containing the tramp element. The sensor may be a camera, wherein the library of observed characteristics was captured by the camera configured to capture images of the samples of the material pieces containing the tramp element as they were conveyed past the camera. The camera may be configured to capture visual images of the first mixture of material pieces to produce image data, wherein the observed characteristics are visually observed characteristics. The sorting by the sorter of the classified material pieces from the first mixture may produce a second mixture of material pieces that includes the first mixture minus the classified material pieces, wherein the second mixture of material pieces contains an aggregate amount of the tramp element of less than 1 wt %. The sorting by the sorter of the classified material pieces from the first mixture may produce a second mixture of material pieces that includes the first mixture minus the classified material pieces, wherein the second mixture of material pieces contains an aggregate amount of the tramp element of less than 0.05 wt %. The tramp element may be copper. The tramp element may be embedded within the material piece.

Aspects of the present disclosure provide a method for classifying a first mixture of materials, wherein the method includes capturing a characteristic of the first mixture of materials with a sensor, and assigning with an AI system a classification to certain ones of the first mixture of materials as containing a contaminant based on the captured characteristics of the first mixture of materials. The classification may be based on a knowledge base containing a previously generated library of one or more observed characteristics captured from a set of samples of materials containing the contaminant, wherein the library of observed characteristics was captured by a camera configured to capture visual images of the set of samples of the materials containing the contaminant as they were conveyed past the camera. The first mixture of materials may be composed of ferrous metals, wherein the contaminant is copper. The method may further include sorting the certain ones of the first mixture of materials from the first mixture as a function of the classification, wherein the sorting produces a second mixture of materials that includes the first mixture of materials minus the sorted certain ones of the first mixture of materials, wherein the second mixture of materials contains an aggregate amount of copper of less than 1 wt %. The method may further include sorting the certain ones of the first mixture of materials from the first mixture as a function of the classification, wherein the sorting produces a second mixture of materials that includes the first mixture of materials minus the sorted certain ones of the first mixture of materials, wherein the second mixture of materials contains an aggregate amount of copper of less than 0.05 wt %. The first mixture of materials may be composed of plastics, wherein the contaminant is a specified additive.

Aspects of the present disclosure provide a computer program product stored on a computer readable storage medium, which when executed by a data processing system, performs a process that includes assigning with an AI system a classification to certain ones of a first mixture of material pieces as containing a contaminant based on one or more characteristics of the first mixture of material pieces captured with a sensor, and sending instructions to a sorting device to sort the certain ones of the first mixture of material pieces from the first mixture, wherein the sorting is performed as a function of the classification. The classification may be based on a knowledge base containing a previously generated library of one or more observed characteristics captured from a set of samples of material pieces containing the contaminant, wherein the library of observed characteristics was captured by a camera configured to capture visual images of the set of samples of the material pieces containing the contaminant as they were conveyed past the camera. The first mixture of material pieces may be composed of ferrous metal scrap pieces, wherein the contaminant is a tramp element. The tramp element may be embedded within one or more of the ferrous scrap pieces. The first mixture of material pieces may be composed of plastics, wherein the contaminant is a specified additive.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a control device, wiring discrete hardware components, or a combination of any or all of the foregoing. Such configured devices are physically designed to perform the specified function or functions.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

The term "coupled," as used herein, is not intended to be limited to a direct coupling or a mechanical coupling. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for classifying a first mixture of material pieces composed of ferrous metals, the system comprising:

a sensor configured to capture one or more characteristics of the first mixture of material pieces composed of ferrous metals; and a data processing system comprising an artificial intelligence ("AI") system configured to classify one or more of the material pieces composed of ferrous metals as containing a tramp element based on the one or more captured characteristics of the first mixture of material pieces composed of ferrous metals, wherein the classifying of one or more of the material pieces composed of ferrous metals as containing a tramp element is based on a knowledge base containing a previously generated library of observed characteristics captured from samples of material pieces containing the tramp element, wherein the sensor is a camera, and wherein the library of observed characteristics was captured by the camera configured to capture images of the samples of the material pieces containing the tramp element as they were conveyed past the camera, wherein the camera is configured to capture visual images of the first mixture of material pieces to produce image data, and wherein the observed characteristics are visually observed characteristics.

2. The system as recited in claim 1, further comprising:

a conveyor system configured to convey the first mixture past the sensor; and a sorter configured to sort the one or more classified material pieces from the first mixture as a function of the classifying of the one or more of the material pieces composed of ferrous metals as containing a tramp element.

3. A system for classifying a first mixture of material pieces composed of ferrous metals, the system comprising:

a sensor configured to capture one or more characteristics of the first mixture of material pieces composed of ferrous metals;

a data processing system comprising an artificial intelligence ("AI") system configured to classify one or more of the material pieces composed of ferrous metals as containing a tramp element based on the one or more captured characteristics of the first mixture of material pieces composed of ferrous metals;

a conveyor system configured to convey the first mixture past the sensor; and a sorter configured to sort the one or more classified material pieces from the first mixture as a function of the classifying of the one or more of the material pieces composed of ferrous metals as containing a tramp element, wherein the sorting by the sorter of the classified material pieces from the first mixture produces a second mixture of material pieces that comprises the first mixture minus the classified material pieces, wherein the second mixture of material pieces contains an aggregate amount of the tramp element of less than 1 wt %.

4. The system as recited in claim 2, wherein the sorting by the sorter of the classified material pieces from the first mixture produces a second mixture of material pieces that comprises the first mixture minus the classified material pieces, wherein the second mixture of material pieces contains an aggregate amount of the tramp element of less than 0.05 wt %.

5. The system as recited in claim 1, wherein the tramp element is copper.

6. The system as recited in claim 1, wherein the tramp element is embedded within the material piece.

7. A method for classifying a first mixture of materials, the method comprising:

capturing a characteristic of the first mixture of materials with a sensor; and assigning with an AI system a classification to certain ones of the first mixture of materials as containing a contaminant based on the captured characteristics characteristic of the first mixture of materials, wherein the classification is based on a knowledge base containing a previously generated library of one or more observed characteristics captured from a set of samples of materials containing the contaminant, wherein the library of observed characteristics was captured by a camera configured to capture visual images of the set of samples of the materials containing the contaminant as they were conveyed past the camera.

8. The method as recited in claim 7, wherein the first mixture of materials is composed of ferrous metals, and wherein the contaminant is copper.

9. A method for classifying a first mixture of materials, the method comprising:

capturing a characteristic of the first mixture of materials with a sensor, wherein the first mixture of materials is composed of ferrous metals, and wherein the contaminant is copper;

assigning with an AI system a classification to certain ones of the first mixture of materials as containing a contaminant based on the captured characteristic of the first mixture of materials; and sorting the certain ones of the first mixture of materials from the first mixture as a function of the classification, wherein the sorting produces a second mixture of materials that comprises the first mixture of materials minus the sorted certain ones of the first mixture of materials, wherein the second mixture of materials contains an aggregate amount of copper of less than 1 wt %.

10. The method as recited in claim 8, further comprising sorting the certain ones of the first mixture of materials from the first mixture as a function of the classification, wherein the sorting produces a second mixture of materials that comprises the first mixture of materials minus the sorted certain ones of the first mixture of materials, wherein the second mixture of materials contains an aggregate amount of copper of less than 0.05 wt %.

11. A method for classifying a first mixture of materials, the method comprising:

capturing a characteristic of the first mixture of materials with a sensor; and assigning with an AI system a classification to certain ones of the first mixture of materials as containing a contaminant based on the captured characteristic of the first mixture of materials, wherein the first mixture of materials is composed of plastics, and wherein the contaminant is a specified additive.

12. A computer program product stored on a computer readable storage medium, which when executed by a data processing system, performs a process comprising:

assigning with an AI system a classification to certain ones of a first mixture of material pieces as containing a contaminant based on one or more characteristics of the first mixture of material pieces captured with a sensor, wherein the classification is based on a knowledge base containing a previously generated library of one or more observed characteristics captured from a set of samples of material pieces containing the contaminant, wherein the library of observed characteristics was captured by a camera configured to capture visual images of the set of samples of the material pieces containing the contaminant as they were conveyed past the camera; and sending instructions to a sorting device to sort the certain ones of the first mixture of material pieces from the first mixture, wherein the sorting is performed as a function of the classification.

13. The computer program product as recited in claim 12, wherein the first mixture of material pieces is composed of ferrous metal scrap pieces, and wherein the contaminant is a tramp element.

14. The computer program product as recited in claim 13, wherein the tramp element is embedded within one or more of the ferrous scrap pieces.

15. A computer program product stored on a computer readable storage medium, which when executed by a data processing system, performs a process comprising:

assigning with an AI system a classification to certain ones of a first mixture of material pieces as containing a contaminant based on one or more characteristics of the first mixture of material pieces captured with a sensor, wherein the first mixture of material pieces is composed of plastics, and wherein the contaminant is a specified additive.

16. The system as recited in claim 2, wherein the first mixture of material pieces comprises ferrous metals containing the tramp element and ferrous metals not containing the tramp element, wherein the ferrous metals containing the tramp element are sorted from the first mixture of material pieces, wherein the ferrous metals containing the tramp element have a different chemical composition than the ferrous metals not containing the tramp element.

17. The method as recited in claim 8, wherein the first mixture of materials comprises ferrous metals containing the contaminant and ferrous metals not containing the contaminant, wherein the ferrous metals containing the contaminant are sorted from the first mixture of materials, wherein the ferrous metals containing the contaminant have a different chemical composition than the ferrous metals not containing the contaminant.

18. The computer program product as recited in claim 13, wherein the first mixture of material pieces comprises ferrous metal scrap pieces containing the tramp element and ferrous metal scrap pieces not containing the tramp element, wherein the ferrous metal scrap pieces containing the tramp element are sorted from the first mixture of material pieces, wherein the ferrous metal scrap pieces containing the tramp element have a different chemical composition than the ferrous metal scrap pieces not containing the tramp element.

19. The system as recited in claim 2, wherein the sorting by the sorter of the classified material pieces from the first mixture produces a second mixture of material pieces that comprises the first mixture minus the classified material pieces, wherein the second mixture of material pieces contains an aggregate amount of the tramp element of less than 1 wt %.

20. The method as recited in claim 8, further comprising sorting the certain ones of the first mixture of materials from the first mixture as a function of the classification, wherein the sorting produces a second mixture of materials that comprises the first mixture of materials minus the sorted certain ones of the first mixture of materials, wherein the second mixture of materials contains an aggregate amount of copper of less than 1 wt %.

21. The method as recited in claim 7, wherein the first mixture of materials is composed of plastics, and wherein the contaminant is a specified additive.

22. The computer program product as recited in claim 12, wherein the first mixture of material pieces is composed of plastics, and wherein the contaminant is a specified additive.

23. The system as recited in claim 2, wherein the sorting by the sorter of the classified material pieces from the first mixture produces a second mixture of material pieces that comprises the first mixture minus the classified material pieces, wherein one or more parameters within the AI system are configured to classify one or more of the material pieces so that the second mixture of material pieces contains an aggregate amount of the tramp element of less than 1 wt %, wherein the tramp element is copper.

24. The system as recited in claim 2, wherein the sorting by the sorter of the classified material pieces from the first mixture produces a second mixture of material pieces that comprises the first mixture minus the classified material pieces, wherein one or more parameters within the AI system are configured to classify one or more of the material pieces so that the second mixture of material pieces contains an aggregate amount of the tramp element of less than 0.05 wt %, wherein the tramp element is copper.

25. The method as recited in claim 8, wherein the sorting by the sorter of the classified material pieces from the first mixture produces a second mixture of material pieces that comprises the first mixture minus the classified material pieces, wherein one or more parameters within the AI system are configured to classify one or more of the material pieces so that the second mixture of material pieces contains an aggregate amount of copper of less than 1 wt %.

26. The method as recited in claim 8, wherein the sorting by the sorter of the classified material pieces from the first mixture produces a second mixture of material pieces that comprises the first mixture minus the classified material pieces, wherein one or more parameters within the AI system are configured to classify one or more of the material pieces so that the second mixture of material pieces contains an aggregate amount of copper of less than 0.05 wt %.

27. The computer program product as recited in claim 12, wherein the sorting by the sorting device of the classified material pieces from the first mixture produces a second mixture of material pieces that comprises the first mixture minus the classified material pieces, wherein one or more parameters within the AI system are configured to classify the material pieces so that the second mixture of material pieces contains an aggregate amount of the contaminant of less than 1 wt %.

28. The computer program product as recited in claim 12, wherein the sorting by the sorting device of the classified material pieces from the first mixture produces a second mixture of material pieces that comprises the first mixture minus the classified material pieces, wherein one or more parameters within the AI system are configured to classify the material pieces so that the second mixture of material pieces contains an aggregate amount of the contaminant of less than 0.05 wt %.

29. The system as recited in claim 1, wherein the classification is based solely on the visually observed characteristics.

30. The method as recited in claim 7, wherein the sensor is a camera, wherein the captured characteristic is a visually observed characteristic, and wherein the classification is based solely on the visually observed characteristic.

31. The computer program product as recited in claim 12, wherein the sensor is a camera, wherein the captured characteristics are visually observed characteristics, and wherein the classification is based solely on the visually observed characteristics.

* * * * *